US009738524B2

(12) United States Patent
Levendis et al.

(10) Patent No.: US 9,738,524 B2
(45) Date of Patent: *Aug. 22, 2017

(54) CARBON NANOSTRUCTURES FROM PYROLYSIS OF ORGANIC MATERIALS

(71) Applicants: Northeastern University, Boston, MA (US); Nano-C, Inc., Westwood, MA (US)

(72) Inventors: Yiannis Levendis, Boston, MA (US); Henning Richter, Newton, MA (US); Chuanwei Zhuo, Malden, MA (US)

(73) Assignees: Nano-C, Inc., Westwood, MA (US); Northeastern University, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/733,019

(22) Filed: Jun. 8, 2015

(65) Prior Publication Data
US 2015/0266738 A1 Sep. 24, 2015

Related U.S. Application Data

(63) Continuation of application No. 13/260,397, filed as application No. PCT/US2010/058876 on Mar. 26, 2010, now Pat. No. 9,051,185.
(Continued)

(51) Int. Cl.
*C01B 31/02* (2006.01)
*B82Y 30/00* (2011.01)
(Continued)

(52) U.S. Cl.
CPC .......... *C01B 31/0226* (2013.01); *B82Y 30/00* (2013.01); *B82Y 40/00* (2013.01);
(Continued)

(58) Field of Classification Search
CPC ..... B82Y 30/00; B82Y 40/00; C01B 31/0233; C01B 33/1071; C01B 2202/06; C01B 2202/34; C01B 2202/36
See application file for complete search history.

(56) References Cited

U.S. PATENT DOCUMENTS

| 3,714,038 A | 1/1973 | Marsh |
| 4,795,340 A | 1/1989 | Bader |

(Continued)

FOREIGN PATENT DOCUMENTS

| JP | WO 2006011655 A1 * | 2/2006 | ............ B82Y 30/00 |
| JP | 2006-111517 A | 4/2006 | |

(Continued)

OTHER PUBLICATIONS

Machine English translation of JP2006111517A.*
(Continued)

*Primary Examiner* — Richard M Rump
(74) *Attorney, Agent, or Firm* — Hamilton, Brook, Smith & Reynolds, P.C.

(57) ABSTRACT

Methods and apparatus to generate carbon nanostructures from organic materials are described. Certain embodiments provide solid waste materials into a furnace, that pyrolyzes the solid waste materials into gaseous decomposition products, which are then converted to carbon nanostructures. Methods and apparatuses described herein provide numerous advantages over conventional methods, such as cost savings, reduction of handling risks, optimization of process conditions, and the like.

18 Claims, 28 Drawing Sheets

Related U.S. Application Data

(60) Provisional application No. 61/301,933, filed on Feb. 5, 2010, provisional application No. 61/163,708, filed on Mar. 26, 2009.

(51) Int. Cl.
  *B82Y 40/00* (2011.01)
  *C01B 33/107* (2006.01)

(52) U.S. Cl.
  CPC ...... *C01B 31/0233* (2013.01); *C01B 33/1071* (2013.01); *C01B 2202/06* (2013.01); *C01B 2202/34* (2013.01); *C01B 2202/36* (2013.01); *Y10S 977/842* (2013.01); *Y10S 977/843* (2013.01)

(56) References Cited

U.S. PATENT DOCUMENTS

| | | | |
|---|---|---|---|
| 4,930,535 | A | 6/1990 | Rinehold |
| 6,830,597 | B1 | 12/2004 | Green |
| 7,819,070 | B2 | 10/2010 | Rehmat et al. |
| 9,051,185 | B2 | 6/2015 | Levendis et al. |
| 2003/0044342 | A1 | 3/2003 | Alford et al. |
| 2003/0143151 | A1* | 7/2003 | Diener ............... B82Y 30/00 423/447.3 |
| 2004/0062704 | A1 | 4/2004 | Allison et al. |
| 2004/0179989 | A1 | 9/2004 | Height et al. |
| 2005/0163696 | A1 | 7/2005 | Uhm et al. |
| 2005/0238566 | A1 | 10/2005 | Rao et al. |
| 2006/0280669 | A1 | 12/2006 | Jones |
| 2007/0183959 | A1 | 8/2007 | Charlier et al. |
| 2008/0318049 | A1* | 12/2008 | Hata ............... B82Y 30/00 428/408 |
| 2009/0062581 | A1 | 3/2009 | Appel et al. |
| 2009/0274609 | A1 | 11/2009 | Harutyunyan et al. |
| 2010/0155216 | A1 | 6/2010 | Benham |
| 2014/0109545 | A1 | 4/2014 | Flanagan et al. |

FOREIGN PATENT DOCUMENTS

| | | |
|---|---|---|
| JP | 2006111517 A * | 4/2006 |
| WO | WO-2006050903 A2 | 5/2006 |
| WO | WO 2009/060461 A2 | 5/2009 |
| WO | WO 2010/111624 A1 | 9/2010 |
| WO | WO 2012/075499 A1 | 6/2012 |

OTHER PUBLICATIONS

Kiselev, N. A., et al. "Carbon nanotubes from polyethylene precursors: structure and structural changes caused by thermal and chemical treatment revealed by HREM." Carbon 36.7 (1998): 1149-1157.*

Bartok, W. et al., "Fossil Fuel Combustion, A Source Book," A Wiley-Interscience Publication, John Wiley & Sons, Inc., New York, pp. 802-806, 7 pages (1991).

Bittencourt, José A., "Fundamentals of plasma physics," Springer, pp. 1-32, 35 pages (2004).

Blank, V. D. et al., "TEM studies of carbon nanofibers formed on Ni catalyst by polyethylene pyrolysis," Nanotechnology, vol. 17, pp. 1862-1866, 6 pages (2006).

Boslaugh, S., "Pyrolysis," Encyclopedia Britannica, Downloaded from <http://www.britannica.com/EBchecked/topic/484978/pyrolysis> on Jul. 16, 2014 (2 pgs.).

International Search Report and Written Opinion issued by the U.S. Patent and Trademark Office as International Searching Authority in corresponding International Application No. PCT/US10/28876 mailed May 4, 2010 (7 pgs.).

Jiang, Z. et al., "Polypropylene as a carbon source for the synthesis of multi-walled carbon nanotubes via catalytic combustion," Carbon, vol. 45, pp. 449-458 (2007).

Kiselev, N. A. et al., "Carbon nanotubes from polyethylene precursors: structure and structural changes caused by thermal and chemical treatment revealed by HREM," Carbon, vol. 36, pp. 1149-1157 (1998).

Kumar, M. and Ando, Y., "Controlling the diameter distribution of carbon nanotubes grown from camphor on a zeolite support," Carbon, vol. 43, pp. 533-540, 8 pages (2005).

Ludlow-Palafox, C. and Chase, H. A., "Microwave-Induced Pyrolysis of Plastic Wastes," Ind. Eng. Chem. Res., vol. 40, pp. 4749-4756 (2001).

Vander Wal, R. L. et al., "Optimization of flame synthesis for carbon nanotubes using supported catalyst," The Journal of Physical Chemistry B, vol. 106.51, pp. 13122-13132 (2002).

Vander Wal, R. L. et al., "Single-walled carbon nanotube synthesis via a multi-stage flame configuration," The Journal of Physical Chemistry B, vol. 106.14, pp. 3564-3567 (2002).

Zhuo, C. et al., "Synthesis of carbon nanotubes by sequential pyrolysis and combustion of polyethylene," Carbon, vol. 48, pp. 4024-4034 (2010).

Partial Supplementary European Search Report issued by the European Patent Office for European Patent Application No. 10756936.0 dated Oct. 6, 2015 (6 pgs.).

International Preliminary Report on Patentability for Int'l Application No. PCT/US10/28876, titled: Carbon Nanostructures From Pyrolysis of Organic Materials, Date of Issuance: Sep. 27, 2011.

International Preliminary Report on Patentabilty for Int'l Application No. PCT/US2011/063306, titled: Method and Device for Fuel and Power Generation by Clean Combustion of Organic Waste Material, Date of Issuance: Jun. 4, 2013.

International Search Report for Int'l Application No. PCT/US2011/063306, titled: Method and Device for Fuel and Power Generation by Clean Combustion of Organic Waste Material, Date Mailed: Mar. 29, 2012.

Written Opinion for Int'l Application No. PCT/US2011/063306, titled: Method and Device for Fuel and Power Generation by Clean Combustion of Organic Waste Material, Date Mailed: Mar. 29, 2012.

Extended European Search Report for EP Application No. 10756936.0, titled: Carbon Nanostructures From Pyrolysis of Organic Materials, Date Mailed: Jan. 28, 2016.

* cited by examiner

CARBON NANOSTRUCTURES FROM PYROLYSIS OF ORGANIC MATERIALS

CROSS-REFERENCE(S) TO RELATED APPLICATIONS

The present application is a continuation of U.S. patent application Ser. No. 13/260,397, filed May 21, 2012, issued as U.S. Pat. No. 9,051,185, which is a National Stage Entry of PCT/US2010/028876, filed Mar. 26, 2010, and claims the benefit of the earlier filing date of U.S. Patent Application No. 61/163,708, filed on Mar. 26, 2009 and U.S. Patent Application No. 61/301,933, filed on Feb. 5, 2010, the contents of which are hereby incorporated by reference herein in their entireties.

STATEMENT REGARDING FEDERALLY SPONSORED RESEARCH OR DEVELOPMENT

The present invention was made with United States government support under Grant No. IIP-0740207 awarded by the National Science Foundation, under Grant No. 0338255 awarded by the National Science Foundation's GK-12-PLUS program (Partners Linking Urban Schools), and under Grant No. DMR-02-13282 awarded by the National Science Foundation. The United States government has rights in this invention.

FIELD OF THE INVENTION

The present disclosure relates to nanotechnology. More particularly, the present disclosure relates to generation of carbon nanostructures.

BACKGROUND

Since the discovery of carbon nanostructures approximately two decades ago, numerous methods for generating carbon nanostructures have been reported. Many efforts revolved around laboratory or batch scale production techniques. With the market for carbon nanostructures expected to grow to over $9 billion in about a decade, efforts to achieve methods of generating carbon nanostructures in the industrial scale are underway. One approach for large-scale generation of carbon nanostructures includes combustion. However, to date, these techniques have involved burning costly or even dangerous (to store and handle) liquid or gaseous fuels under stringent processing conditions to generate the carbon nano structures.

SUMMARY

The present disclosure is related to using solid materials as safe and inexpensive starting material for the generation of carbon nanostructures. In certain embodiments, use of solid and/or liquid organic materials as safe and inexpensive starting for the generation of carbon nanostructures using combustion is described.

In certain embodiments, a method of synthesizing carbon nanostructure is described. The method includes pyrolyzing an organic material to obtain one or more gaseous decomposition products; mixing the one or more gaseous decomposition products with a gas containing oxygen to obtain a fuel-rich flame; and contacting one or more effluents of the fuel-rich flame with a supported catalyst to form the carbon nanostructure.

In some other embodiments, a method of synthesizing carbon nanostructure is described. In some embodiments, the method includes pyrolyzing an organic material to obtain a feedstock which comprises one or more gaseous decomposition products; passing the feedstock through a filter to obtain a filtered gas; and providing the filtered gas in a carbon nanostructure manufacturing process to form a carbon nanostructure. In some embodiments, the one or more gaseous decomposition products are mixed to obtain a fuel-rich flame.

In some embodiments, the pyrolyzing step is carried out in an inert atmosphere.

In some embodiments, the method further includes adding hydrogen, oxygen, water vapor, sulfur-containing compound, or combinations thereof to promote activation of the supported catalyst. In some cases, the hydrogen, oxygen, water vapor, sulfur-containing compound, or combinations thereof is/are added from about 0.0001% to about 80% by volume.

In some embodiments, the organic material can be a solid organic material. The solid organic material can be a solid plastic, such as pellets, chips, chunks, or combinations thereof. For example, the solid organic material includes an alcohol, alkane, alkene, alkyne, aromatic, acrylate, or combinations thereof. In some cases, the solid organic material is polyethylene, polypropylene, polystyrene, polyethylene terephthalate, polyvinyl chloride, polylactic acid, polycarbonate, nylon, acrylonitrile butadiene styrene, polymethyl methacrylate, styrene-butadiene rubber, or combinations thereof. In some other cases, the solid organic material is solid fractions of the petroleum refining process such as tars, biomass, corn, cotton, rubber, tire, coal, wood, lignin, cellulose, or combinations thereof.

In some embodiments, the organic material can be a liquid organic material. The liquid organic material can be different fractions of the petroleum refining process, such as gasoline, diesel, or the like.

In some embodiments, the organic material includes both solid and liquid products.

In some embodiments, the filter is a ceramic monolith barrier filter. In some cases, the one or more effluents of the fuel-rich flame is passed through multiple filters.

In some embodiments, the supported catalyst includes a waste material. For example, the waste material can include metal chips and/or turnings from machining operations.

In some embodiments, the method further includes adding an inert gas during the mixing step.

In some embodiments, the pyrolyzing step is carried out in a first furnace.

In some embodiments, the mixing step is carried out in a venturi section of the first furnace.

In some embodiments, the contacting step is carried out in a second furnace.

In some embodiments, the passing step filters out one or more condensed phase products.

In some embodiments, at least one characteristic of the carbon nanostructure is dependent on based on temperature of the pyrolyzing step.

In some embodiments, the supported catalyst is iron, nickel, cobalt, tungsten, molybdenum, niobium, copper, zinc, tin, cadmium, vanadium, chromium, zirconium, yttrium, scandium, or combinations thereof.

In some embodiments, the one or more gaseous decomposition products comprise hydrogen, carbon monoxide, aliphatic hydrocarbons, aromatic hydrocarbons, oxygenated hydrocarbons or combinations thereof. For example, the one or more gaseous decomposition products include ethylene, methane, acetylene, propylene, styrene, polycyclic aromatic hydrocarbons, aromatic compounds, hydrogen, or combinations thereof.

BRIEF DESCRIPTION OF THE DRAWINGS

The above and other objects and advantages of the present invention will be apparent upon consideration of the following detailed description, taken in conjunction with the accompanying drawings, in which like reference characters refer to like parts throughout, and in which.

DETAILED DESCRIPTION

Figure 1:
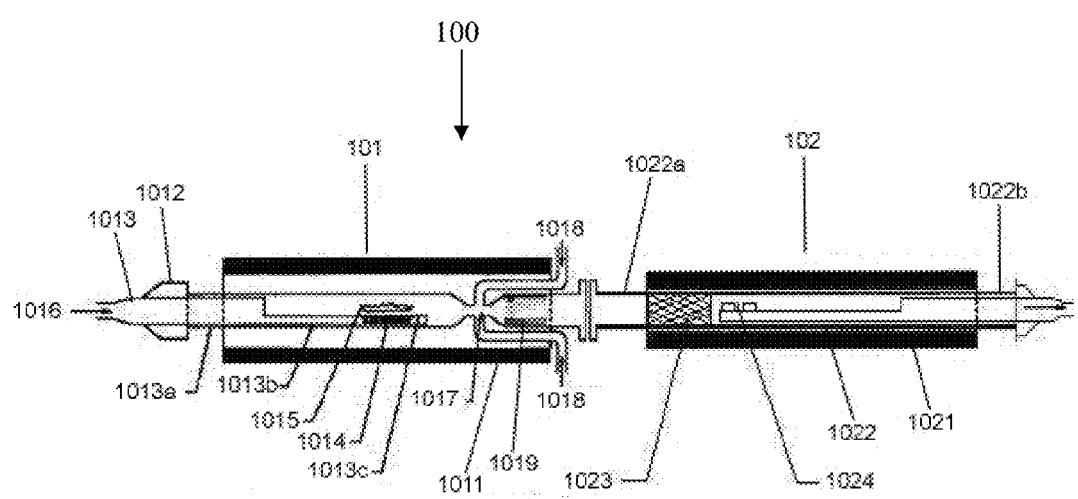
FIG. 1 is a diagrammatic representation of an apparatus to generate carbon nanostructures using solid organic materials in accordance with certain embodiments.

All publications, patent applications, patents, and other references mentioned herein are incorporated by reference in their entirety. In case of conflict, the present specification, including definitions, will control. In addition, the materials, methods, and examples are illustrative only and not intended to be limiting. Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described Apparatus and methods described here provide the ability to use solid and/or liquid organic materials, such as solid and/or liquid wastes, to generate high-value carbon nanostructures. For example, plastics are a rapidly growing segment of the municipal solid waste stream (MSW) and currently 30 million tons of this waste is generated every year in the United States, representing approximately 12 wt % of the total municipal waste stream. However, much of these waste plastics are neither incinerated nor recycled, and only fill up landfills. For example, high density polyethylene (HDPE) is used for durable applications such as milk jugs, outdoor furniture, and piping systems. However, conventional efforts in incineration pose further challenges as combustion or pyrolysis at increasingly higher temperatures generally lead to increased emission of pollutants, such as soot or other condensed particulates. Besides, only 27% of all HDPE produced is recycled and only a fraction of the recycled materials finds end uses. Therefore, much of the waste plastic materials, such as HDPE, are not recycled, and they form economically cheap source of materials for producing high value carbon nanostructures.

In addition, such solid organic materials are common items that are readily used in household and do not pose any serious health risks. Accordingly, use of common household or industrial waste solids as precursors for the generation of carbon nanostructures reduces storage risks and costs of the feedstock supplies.

Moreover, risks of handling highly-reactive gases, such as $H_2$, are eliminated as they are generated in situ in combination with an inert gas. In certain embodiments, the process conditions can allow quick consumption of this hydrogen gas during the described methods to reduce spontaneous explosion. Alternatively, hydrogen gas found in the exhaust gas can be recovered for other commercial value.

Further, the conventional challenges of flame synthesis, particularly where diffusion flames are used, and where local flame conditions at the synthesis site suffers from flame condition inconsistencies are also overcome. In accordance with certain embodiments, generation of carbon nanostructures take place downstream of a premixed flame and the stable products of combustion are present during carbon nanostructures generation. Moreover, decoupling of the pyrolyzation and carbon nanostructure generation enables the monitoring of the premixed flame effluents close to the location where carbon nanostructures are generated, allowing assessment of the mechanisms of carbon nanostructure synthesis, which in turn can facilitate improvements and optimization of the processing conditions. Even further, the temperature at which carbon nanostructure generation occurs can be selected largely independent of the flame temperature, allowing for a greater degree of freedom and providing an avenue for further optimization of the entire process.

In addition, heat released during combustion can be recycled as heat to be used for pyrolyzation. For example, the heat of pyrolysis of polyethylene (PE) is approximately 254 kJ/kg. The heating value (energy content) of PE is approximately 46,000 kJ/kg (corresponding to a heat of combustion of −46,000 kJ/kg). Similarly, the heat of pyrolysis of polypropylene (PP) and polystyrene (PS) are 423 kJ/kg and 1,500 kJ/kg, respectively while the energy content of these polymers are approximately 45,000 kJ/kg. Accordingly, because the heat of pyrolysis is small compared to the energy content of these polymers and the energy balance is net positive (i.e., the overall process is exothermic), only a small fraction of the heat released during combustion is sufficient to be fed back to pyrolyzation stage. In certain embodiments, a portion of the heat released during combustion can also be used in a heat-exchanger/pyrolyzer unit to gasify incoming solid organic materials, while the remaining heat can be used elsewhere as process-heat.

Accordingly, the invention provides significant advantages over conventional techniques for generating carbon nanostructures.

Apparatus

In accordance with certain embodiments, FIG. 1 shows an apparatus 100 containing a primary furnace 101 and a secondary furnace 102 that is useful in generating carbon nanostructures. In certain embodiments, the primary furnace 101 can be a laminar muffle flow furnace and the secondary furnace 102 can be a laminar flow reactor.

As shown in FIG. 1, the primary furnace 101 contains a primary furnace heating element 1011 to heat the primary furnace chamber 1012. Within the primary furnace chamber 1012, feedstock loading components 1013 can be provided, such as a quartz tube 1013a, which is cut to form a half tube 1013b, onto which a porcelain boat 1013c containing the organic material 1014 can be loaded. The organic material 1014 may be placed at desired or optimal positions within the primary furnace chamber 1012 to carry out pyrolysis therein to form pyrolyzates or gaseous decomposition products 1015.

In certain embodiments, the primary furnace chamber 1012 can contain an inlet 1016 to allow gases, such as an inert gas (e.g., nitrogen, argon, and the like), to enter the primary furnace chamber 1012 so that the pyrolyzation can occur under the desired conditions, such as under inert atmosphere.

The primary furnace 101 can further contain a venturi section 1017 near one end of the primary furnace chamber 1012 so that the gaseous decomposition products 1015 can enter the venturi section 1017. As would be understood by one of ordinary skilled in the art, a venturi section 1017 refers to a constricted section of the primary furnace chamber 1012 that cases a reduction in fluid pressure, which in turn causes an increase in the fluid velocity. Moreover, the venturi section 1017 need not be part of the primary furnace 101 but may be provided as a separate component that is connected to the primary furnace 101.

The venturi section 1017 can further be provided with one or more inlets 1018 that can introduce additional materials, such as one or more gases (e.g., oxidizing agents such as oxygen gas, chlorine gas, carbon dioxide, any other gas containing oxygen, and the like) to mix with the gaseous decomposition products 1015 that enter the venturi section 1017. In certain embodiments, the inlets 1018 can be positioned so that mixing occurs between the gaseous decomposition products 1015 and the one or more gases that enter through inlets 1018. In certain embodiments, the mixing can cause ignition (e.g., auto-ignition) leading to a sooting flame in the post-venturi section 1019. In other embodiments, the mixing can cause ignition and leading to a laminar flame in the post-venturi section 1019.

The post-venturi section 1019 can be connected to a secondary furnace 102, particularly to a first end 1022a of a secondary furnace chamber 1022. The secondary furnace 102 can contain a secondary heating element 1021 to heat the second furnace chamber 1022 to desired temperatures.

A filter 1023, such as a ceramic filter, can be included near the first end 1022a of the secondary furnace chamber 1022. However, the filter 1023 need not be part of the secondary furnace 102 but can be provided at any desired location between the primary furnace 101 and the secondary furnace 102. In embodiments where the flame in the post-venturi section 1019 contains particulates (e.g., soot or other particulates), the filter 1023 may act to filter out at least some, most, or all of the particulates from entering the second furnace chamber 1022. One or more filters can be utilized. For example, multiple filters can be stacked together, either placed parallel or in series to further increase the filter efficiency.

The second heating element 1021 may provide sufficient heating to allow the generation of carbon nanostructures in the second furnace chamber 1022. The second furnace 102 may further be equipped with other suitable components, such as a vacuum pump (not shown) and suitable connectors thereof (not shown) to provide sub-atmospheric conditions in the secondary furnace chamber 1022, that can further facilitate, promote, or enhance the formation of carbon nanostructures.

In certain embodiments, the secondary furnace chamber 1022 may contain catalyst 1024 that can aid in the formation of carbon nanostructures. In certain embodiments, the gaseous decomposition products from the post-venturi section 1019 can enter the secondary furnace chamber 1022 to contact the catalyst 1024 contained inside the secondary furnace chamber 1022. As the gaseous decomposition products contact the catalyst 1024, generation of carbon nanostructures can begin, be promoted, or be enhanced. In certain embodiments, the catalyst 1024 can be a supported catalyst that acts as both a catalyst and a carbon nanostructure collecting vessel or a substrate 1025 (not shown). In other embodiments, catalyst 1024 may be a separate component from the substrate 1025.

In certain embodiments, one or more catalysts 1024 can be utilized. For example, multiple stainless steel wire meshes or the like can be stacked together, placed parallel or in series (e.g., folded, rolled, and the like) to further increase the catalyst surface area. In some embodiments, the surface area of the catalyst can increase by 1,000 to several million times depending on the available secondary furnace chamber 1022 and design of apparatus 100.

In certain embodiments, the substrate 1025 can be recycled and reused for multiple times for each generation of carbon nanostructures. The substrate 1025 can include waste materials, such as waste metal chips and turnings from machining operations.

The carbon nanostructures generated can then be collected from the substrate 1025 as would be readily apparent to one of ordinary skill in the art.

Variations and modifications to the apparatus 100 will be readily apparent to one of ordinary skill in the art and are within the scope of the present disclosure. For example, in certain embodiments, apparatus 100 can be a single furnace containing a primary section and a secondary section, and need not be embodied as two separate furnaces as exemplified in FIG. 1. Other variations and modifications are possible.

Figure 2:
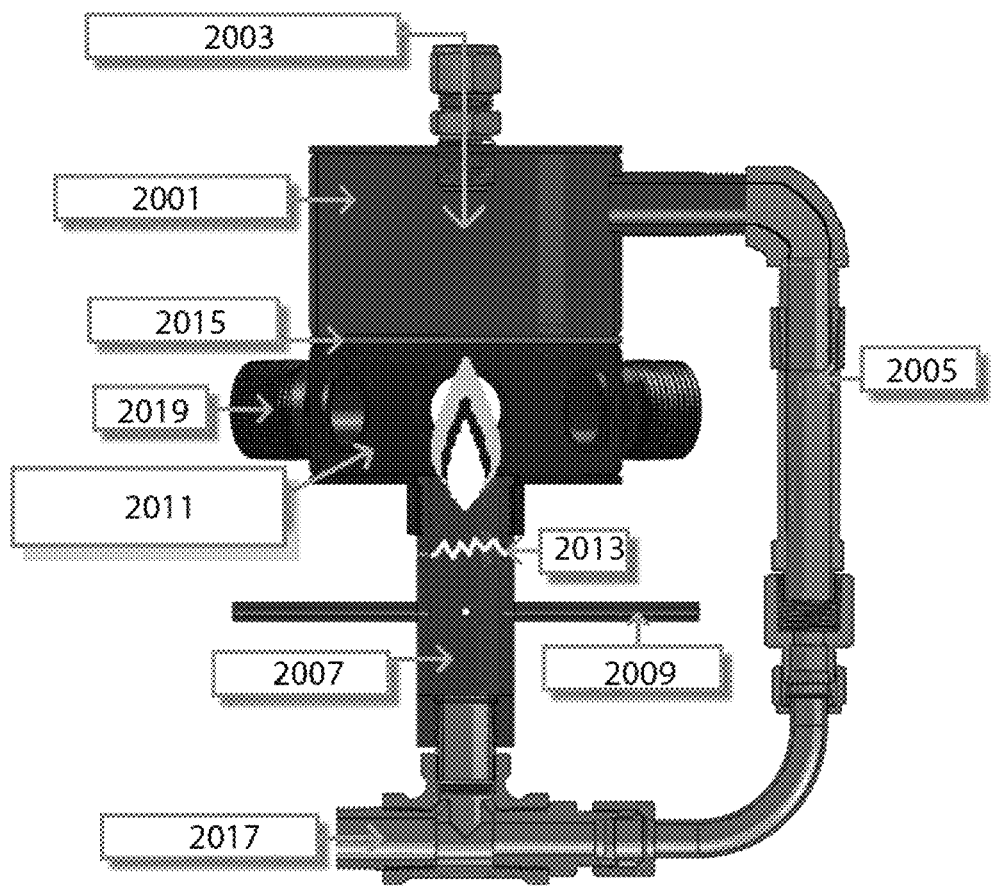
FIG. 2 is a diagrammatic representation of an alternative apparatus to generate carbon nanostructures using solid organic materials in accordance with certain embodiments.

For example, an alternative apparatus to generate carbon nanostructures from organic materials is shown in FIG. 2. In certain embodiments, the apparatus can be a self-sustaining apparatus capable of mass producing carbon nanostructures. As shown in FIG. 2, the apparatus includes a pyrolyzer chamber 2001, where one or more gaseous decomposition products are generated through pyrolysis of organic materials that are provided through inlet 2003. The gaseous decompositions enter fuel line 2005, pass through a venturi section 2007 which mix with one or more gases containing oxygen that are provided through inlets 2009. The mixed gases burn in combustion chamber 2011, as they are ignited by the spark 2013. The carbon nanostructures are synthesized in chamber 2011.

The combustion-generated heat then supplies the pyrolysis chamber 2001 through a common plate 2015. The organic materials may be controllably fed by inlet 2003 (e.g., a solid fuel auto feeding system) through the top of the pyrolysis chamber 2001, with nitrogen as the carrier gas. The generation of gaseous decomposition products can be initialized by burning natural gas at the bottom of the apparatus, which is fed through natural gas input 2017. Upon heating, the organic materials pyrolyze, generating gaseous decomposition products, which is piped to the bottom of this device, and eventually substitute the natural gas. Generation of carbon nanostructure can take place inside the combustion chamber 2011. Exhaust gases may exit through exhaust 2019.

In certain embodiments, the apparatus can allow production of carbon nanostructures without extraneous energy inputs, other than the organic materials. The only energy requirement will be that of the energy content of the organic material, which can be released during combustion. Some of this energy can be used to heat the pyrolyzer chamber 2001, while other fractions can be used to in other processes (e.g., preheat the oxidizer gas and the inert gas). There may also be an energy surplus, which can further be used for other purposes.

Method

Figure 3:
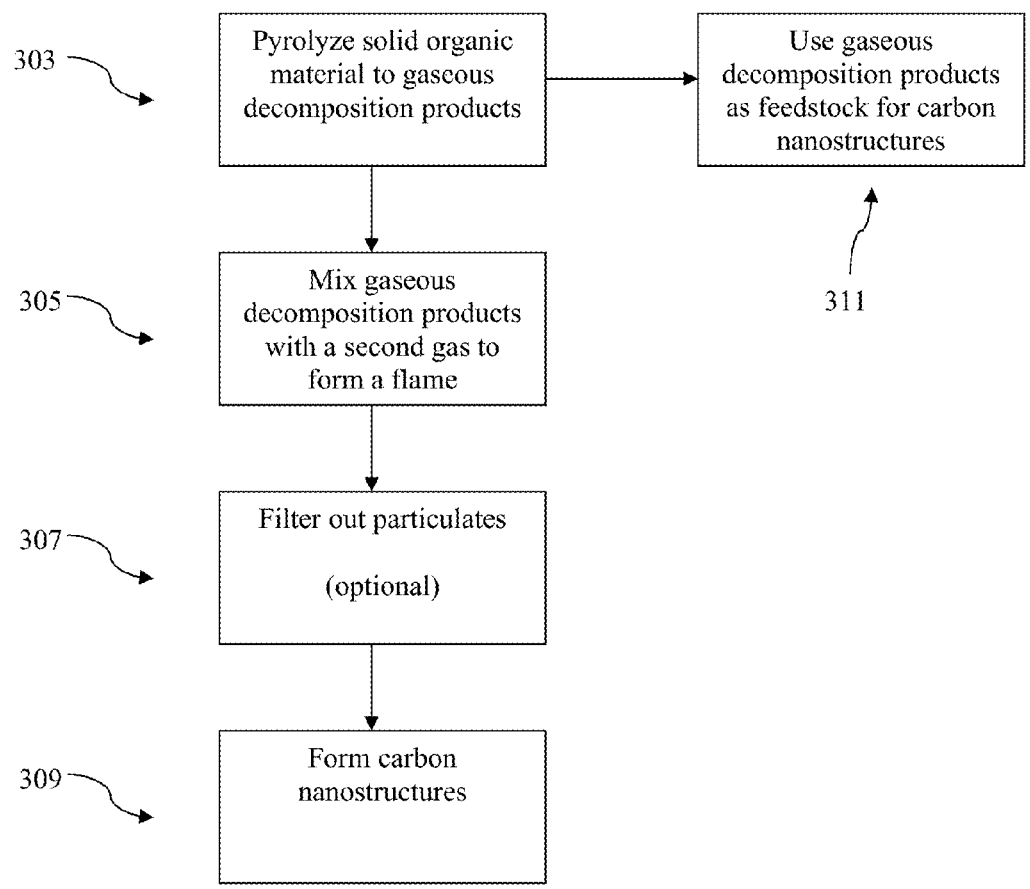
FIG. 3 is a diagrammatic representation of a method to generate carbon nanostructures using solid organic materials in accordance with certain embodiments.

As shown in FIG. 3, methods to generate carbon nanostructures using organic materials is described herein. As shown in 303, the organic materials can be pyrolyzed to form pyrolyzates or gaseous decomposition products. In certain embodiments, 303 can be carried out in a suitable pyrolyzing apparatus, such as the primary furnace 101 shown in FIG. 1. Pyrolysis can occur in the presence of one or more inert gases, such as nitrogen, argon, and the like, preventing ignition and combustion of the pyrolyzates or gaseous decomposition products therein.

In certain embodiments, pyrolysis can be carried out under conditions that allows greater than 80%, 85%, 90%, or even 95% conversion of the organic material to gaseous decomposition products. In certain embodiments, pyrolysis can be carried out at temperatures above 600° C., or above 700° C., or above 800° C., or above 900° C., or even above 1000° C. to maximize the amount of gaseous decomposition products.

Carrying out pyrolysis at such increased temperatures is contrary to conventional wisdom as pyrolysis at higher temperatures can lead to significant increase in the emission of undesired condensed particulates, such as soot. Such condensed particulates are environmental pollutants and conventional efforts have attempted to carry out pyrolysis at lower temperatures to minimize pollutant emissions. Moreover, such condensed particulates are undesirable in generation of carbon nanostructures as presence of such condensed particulates deactivate the catalysts for synthesis of carbon nanostructures and lower yields of carbon nanostructures would be expected. Nevertheless, carrying out pyrolysis at increased temperatures, by carefully designed management of the condensed particulates, can lead to increased yields of the carbon nanostructures as greater amounts of gaseous decomposition products that serve as carbon nanostructure precursors can be formed.

As shown in 305, the gaseous decomposition products can be mixed with one or more gases, for example, a gas containing oxygen, to form a flame. The flame may be a sooting flame or a non-sooting flame.

In certain embodiments, to form the flame, the gaseous decomposition products can be released quasi-uniformly using a purposely-designed device (e.g., a continuous feeding system, a fluidized bed, etc.), and passed into an area, such as the venturi section 1017 shown in FIG. 1, to effectuate mixing with the one or more gases. Suitable gases to mix with the gaseous decomposition products include gas containing oxygen, such as air. Upon or during mixing, auto-ignition can occur to form a premixed flame.

In some embodiments, the one or more gases may be added at a quantity so that the fuel/oxygen ratio can be made fuel-rich (i.e., oxygen-deficient). Without wishing to be bound by theory, such oxygen-deficient condition may promote growth of carbon nanostructure growth by maintaining a sufficient amount of CO, hydrogen or other suitable feedstock such as small hydrocarbons in the flame.

In certain embodiments, the one or more gases may not contain oxygen or can contain additional gases in addition to oxygen. For example, inert gases, such as, but not limited to, nitrogen, argon, and the like, can be added mixed with the gaseous decomposition products. In certain embodiments, the presence of these other gases may prevent formation of a flame. Rather than forming a flame, the gaseous decompositions products may pass into an area capable of generating carbon nanostructure, such as the secondary furnace chamber 1022 shown in FIG. 1, after being channeled through the particulate filter to form carbon nanostructures.

In embodiments where flame is established, the premixed flame can partially penetrate into the ensuing secondary furnace 1022. In some embodiments, the premixed flame effluents can pass through a filter 1023 to filter out one or more particulates contained in the flame.

As shown in 307, the effluents of the flame may then pass through a filter, such as a filter 1023 shown in FIG. 1, or any other filter capable of operating under high temperature conditions. The filter can trap at least some solid particles (e.g., soot) before the effluents of the flame is introduced into an area capable of generating carbon nanostructures, such as the secondary furnace chamber 1022 shown in FIG. 1. In certain embodiments, the filter can further act as a flow straightener before the effluents of the flame enter into the secondary furnace chamber 1022.

In some embodiments, selection of appropriate solid organic materials, absence of oxygenate gases, and non-sooting combustion conditions, can allow for the omission of the filter.

As shown in 309, upon entry into the area capable of generating carbon nanostructures, carbon nanostructures can form. In certain embodiments, the area capable of generating carbon nanostructures, such as the secondary furnace 102, can be maintained at conditions that promote the generation of carbon nanostructures, such as the synthesis temperature ranging from 600° C. to 1500° C., effluent flow velocities ranging from 0.1 cm/s to 10 cm/s, associating with the apparatus 100, and the like.

In certain embodiments, the area capable of generating carbon nanostructures may include one or more catalysts that promote the generation of carbon nanostructures. In some embodiments, the catalyst is a fixed or supported catalyst, which is pre-inserted into the area capable of generating carbon nanostructures. In certain embodiments, the carbon nanostructures can be grown on top of the supported catalysts for subsequent collection.

Alternatively, as shown in 311, the gaseous decomposition products can be used as a starting feedstock material for generation of carbon nanostructures in other nanostructure manufacturing processes, such as, but not limited to, chemical vapor deposition (CVD), flow reactor, fluidized beds using floating or supported catalysts, and the like. In such embodiments, any condensed particulates that form in pyrolysis can be removed through filtration of the condensed particulate before the gaseous decomposition products are provided in the nanostructure manufacturing processes. The filtered condensed particulates can be collected so that they are not emitted as environmental pollutants.

Additional variation of the method described in FIG. 3 is within the scope of the present disclosure. For example, oxygen, hydrogen, sulfur-containing compounds such as thiophene, or combination thereof, such as water vapors, can be added to the primary furnace chamber 1012, the venturi section 1017, or the secondary furnace chamber 1022 to promote activation and maintaining high catalytic activity of the catalysts. The range of the gas to be added may be from about 0.0001% (or 1 ppm) to about 80% by volume.

Materials

Carbon Nanostructures

As used herein, carbon nanostructures include, but are not limited to, carbon nanofibers with or without hollow cavity, and spherical multi-layer onion carbons. Fiber walls can include amorphous carbon or graphitic structures of different degrees of perfection. Hollow carbon nanofibers with graphitic wall structures containing parallel walls are called carbon nanotubes. Carbon nanotubes are defined based on the number of parallel walls: single-walled nanotubes, double-walled nanotubes, triple-walled nanotubes, and so forth. Generally, carbon nanotubes having multiple number of walls are called multi-walled nanotubes.

In certain embodiments, the characteristics of the carbon nanostructures are determined by the operating conditions. For example, the degree of graphitization of the walls of the hollow nanofibers can be dependent on the temperature of the secondary furnace 102.

Organic Materials

In the present disclosure, rather than using expensive and highly purified premium fuels for combustion or CVD process, methods and apparatus to generate of carbon nanostructures using solid organic materials, such as solid waste materials, including solid plastics in the form of pellets, chips, chunks, and the like, as the starting material is described.

Figure 15:
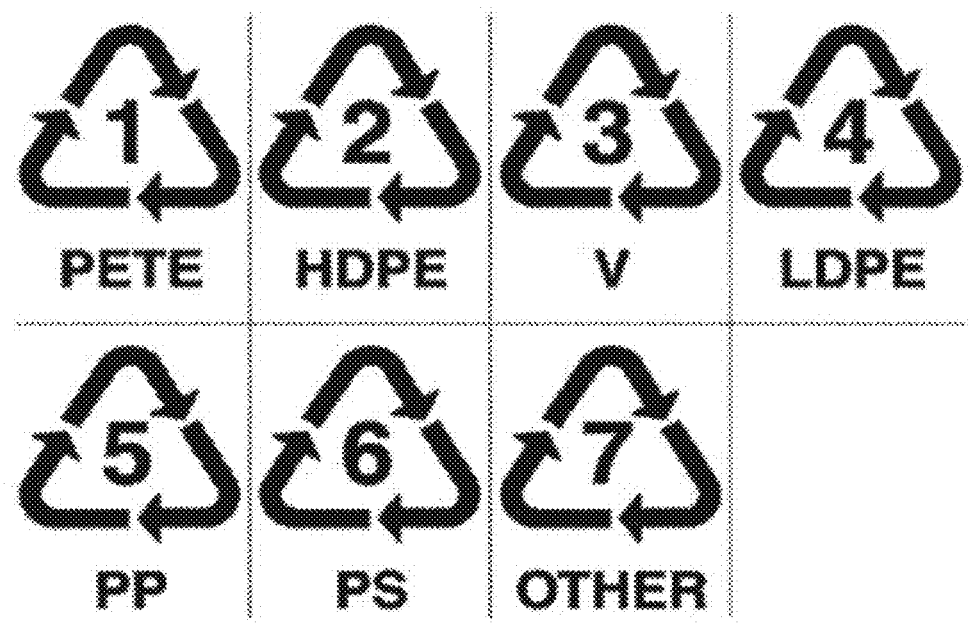
FIG. 15 shows plastics with markers that may be useful.

Numerous different types of solid organic materials can be utilized in this invention. In certain embodiments, the solid organic material can include a solid plastic, such as, but not limited to, polyethylene, polypropylene, polystyrene, polyethylene terephthalate, polyvinyl chloride, polylactic acid, polycarbonate, nylon, acrylonitrile butadiene styrene, polymethyl methacrylate, styrene-butadiene rubber, or combinations thereof. For example, plastics having the markers shown in FIG. 15 may be useful.

In some other embodiments, the solid organic material can be in the form of pellets, chips, chunks, or combinations thereof. In yet some other embodiments, the solid organic material can contain various groups, such as an alcohol, alkane, alkene, alkyne, aromatic, acrylate, cellulose, or combinations thereof. Other solid organic materials can be used, such as, but not limited to, biomass, corn, cotton, rubber, tire, coal, wood, lignin, or combinations thereof.

In some embodiments, the solid organic materials can be selected to obtain desired gaseous decomposition products. For example, under certain conditions, pyrolysis of PE yield about 50% ethylene, 20% methane, 6% acetylene, and 3% propylene. The type of PE, i.e., low density PE (LDPE) or high density PE (HDPE), do not have significant influence on the product spectrum produced. On the other hand, pyrolysis of PS has been shown to produce pyrolyzates, consisting mainly of styrene (75%) together with other aromatic and polycyclic aromatic compounds.

In some embodiments, liquid organic materials can be utilized. For example, liquid organic materials can include, but not limited to, different fractions of the petroleum refining process (e.g., gasoline, diesel, etc.) can be used.

Catalysts

Non-limiting examples of catalysts useful herein include plain metal wires, screens, wire meshes, and the like that include stainless steel, iron, nickel, cobalt, tungsten, molybdenum, niobium, copper, zinc, tin, cadmium, vanadium, chromium, zirconium, yttrium, scandium, or combinations thereof. For example, type 304 stainless steel, type 316 stainless steel, type 330 stainless steel, and the like can be used. Catalysts can further be combined with or deposited with one or more other metals using, for example, sputtering, electrochemical-based deposition, solution-based deposition, and the like. More than one metal can be deposited simultaneously or sequentially. Useful precursors include, but are not limited to, iron pentacarbonyl and ferrocene. Other suitable substrates include calcium oxide, magnesium oxide, silica and combinations thereof.

INDUSTRIAL APPLICABILITY

Applications of carbon nanostructures are numerous and varied. Major fields of interest including the following nanotube products and their actuators in the conversion of electrical energy to mechanical energy and vice versa, use in robotics, optical fiber switches, displays, and prosthetic devices. Other applications include energy harvesting, batteries, composites, electrostatic dissipation (ESD), and preparation of tires.

For example, carbon nanostructures can be used as electrode material in batteries, either exclusively or as additive, for instance increasing electrical conductivity.

Due to their thermal conductivity, carbon nanostructures such as carbon nanotubes can be used for heat dissipation in electronic devices.

In another example, nanotubes can be used as sensors as correlations between adsorption of gases such as oxygen and conductance and thermoelectric power have been observed. Additional examples include use of nanotubes as composites in a polymer-nanotube combination where improved strength performance is observed. Further enhancements can be obtained by functionalizing the nanotube walls so that nanotube can be anchored to polymeric structures.

In addition, because their physical dimensions are similar to those of biologically active macromolecules such as proteins and DNA, CNTs are useful in biology-related applications, including, but not limited to, detection, drug delivery, enzyme immobilization, and DNA transfection.

Depending on structural characteristics, CNTs can be metallic or semiconducting. The sizes of transistors and logic devices can be reduced significantly using CNTs. For example, a logic device can be made of a single nanotube with a transition between chiralities along its length. Additionally, highly-ordered carbon nanotube arrays can be used for a variety of electronics application ranging from data storage, display, and sensors to smaller computing devices. Commercial application of carbon nanotubes in the area of flat panel displays (FPD) is also credible.

CNTs are also useful as hydrogen storage materials. For example, single-walled nanotubes are suitable for hydrogen storage systems necessary in hydrogen-powered vehicles.

EXAMPLES

The following non-limiting examples further illustrate certain embodiments.

Example 1

In this study we used two electrically heated furnaces in series as shown in FIG. 1. In the first furnace, 1 g±1% of HDPE bottles, in the form of 10×50 mm strips, were pyrolyzed at a furnace temperature of 800° C., in a reactor having an inner diameter of 3.7 cm and a length of 87 cm, under a nitrogen atmosphere.

The pyrolysis effluent was combined with pure oxygen, in a venturi section of the furnace having a diameter of 0.8 cm, forming a mixture containing 23% oxygen. Upon autoignition, a nominally-premixed fuel-rich flame was obtained, generating 10 vol % CO and 9 vol % $H_2$.

A flame was visible for approximately thirty seconds with an average equivalence ratio of $\phi=2.6$, where $\phi$ is defined as $\phi=(m_{fuel}/m_{oxygen})_{actual}/(m_{fuel}/m_{oxygen})_{stoichiometric}$. The flame had a bright yellow color, typical of sooting flames.

The combustion effluent entered a second temperature-controlled furnace having an inner diameter of 3.7 cm and a length of 26 cm and heated to 750° C., where it was channeled through a silicon carbide ceramic barrier filter with a 97% retention rate for particles >1 µm. Type 304 stainless steel was used as substrates as well as catalysts (400×400 wire per 2.54 cm (one inch) mesh with 25.4 µm diameter wire); this steel is an alloy which consists of 67%$_{wt}$ iron (Fe), 11% nickel (Ni) and 18-20% chromium (Cr) with traces of manganese (Mn), silicon (Si), phosphorus (P), sulfur (S) and carbon (C). There was no chemical pretreatment of the mesh to alter its grain size; however the mesh was brought up to the synthesis temperature during the furnace heat up, prior to the introduction of HDPE in the system. At the end of combustion, the furnace was allowed to cool under an inert atmosphere, until the internal temperature was well-below the oxidation temperature of MWCNT.

Figure 4A:
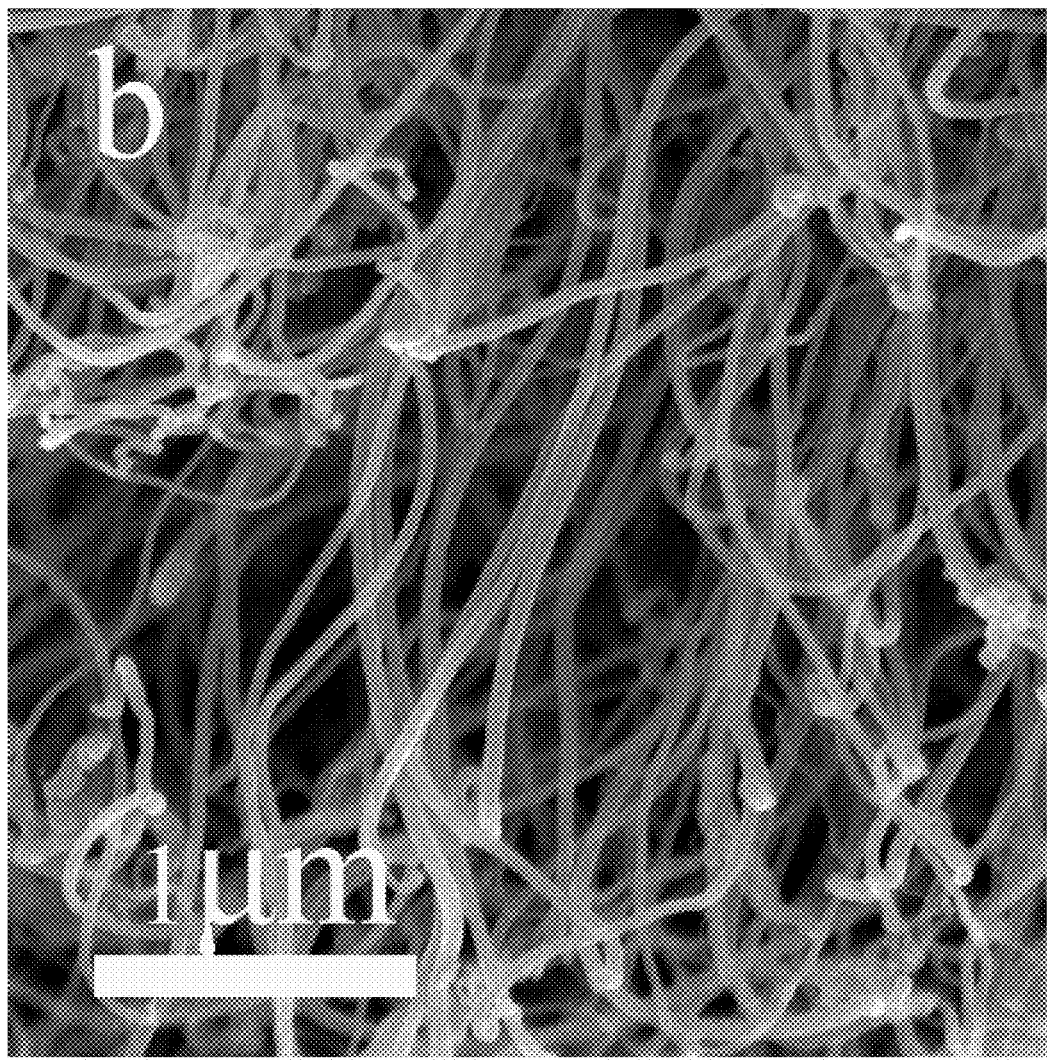
FIG. 4A is a representation of a scanning electron microscope (SEM) image of the carbon nanostructure obtained in accordance with certain embodiments.
Figure 4B:
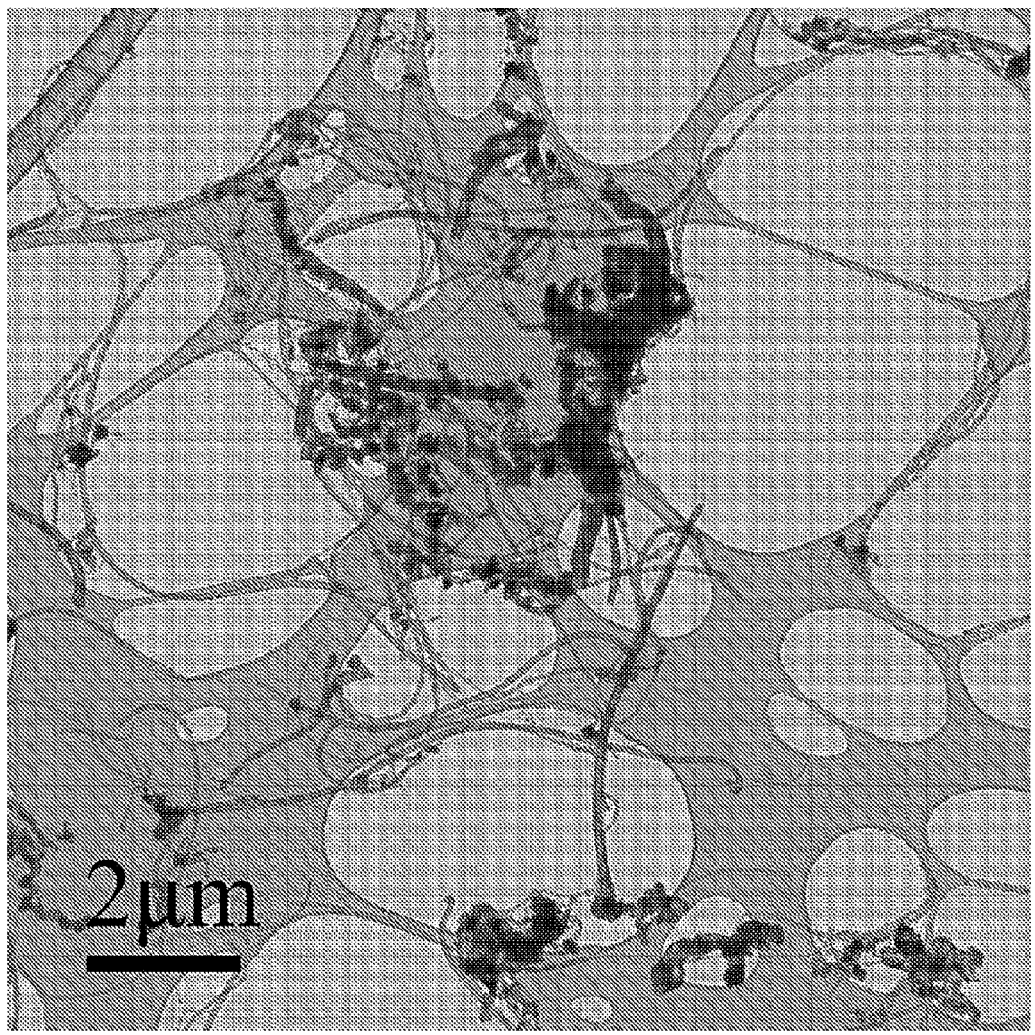
FIG. 4B is a representation of a transmission electron microscope (TEM) image of the carbon nanostructure obtained in accordance with certain embodiments.

After the experiments, the substrates were covered with a layer of black material, which was examined by scanning electron microscopy (SEM) and transmission electron microscopy (TEM) imaging. SEM was conducted on a Hitachi 4800 using a voltage of 3 kV and a working distance of 8.2 mm. Pieces of substrates removed from the reactor were placed directly on the SEM imaging stage. SEM images, taken at different magnifications without any prior sample preparation, reveal the existence of tubular structures grown on the surface of the substrates (FIGS. 4A and 4B). Tubular MWCNT structures with lengths usually of 2 µm-10 µm and diameters between 15 and 84 nm were identified using TEM (see FIG. 4B).

Figure 5A:
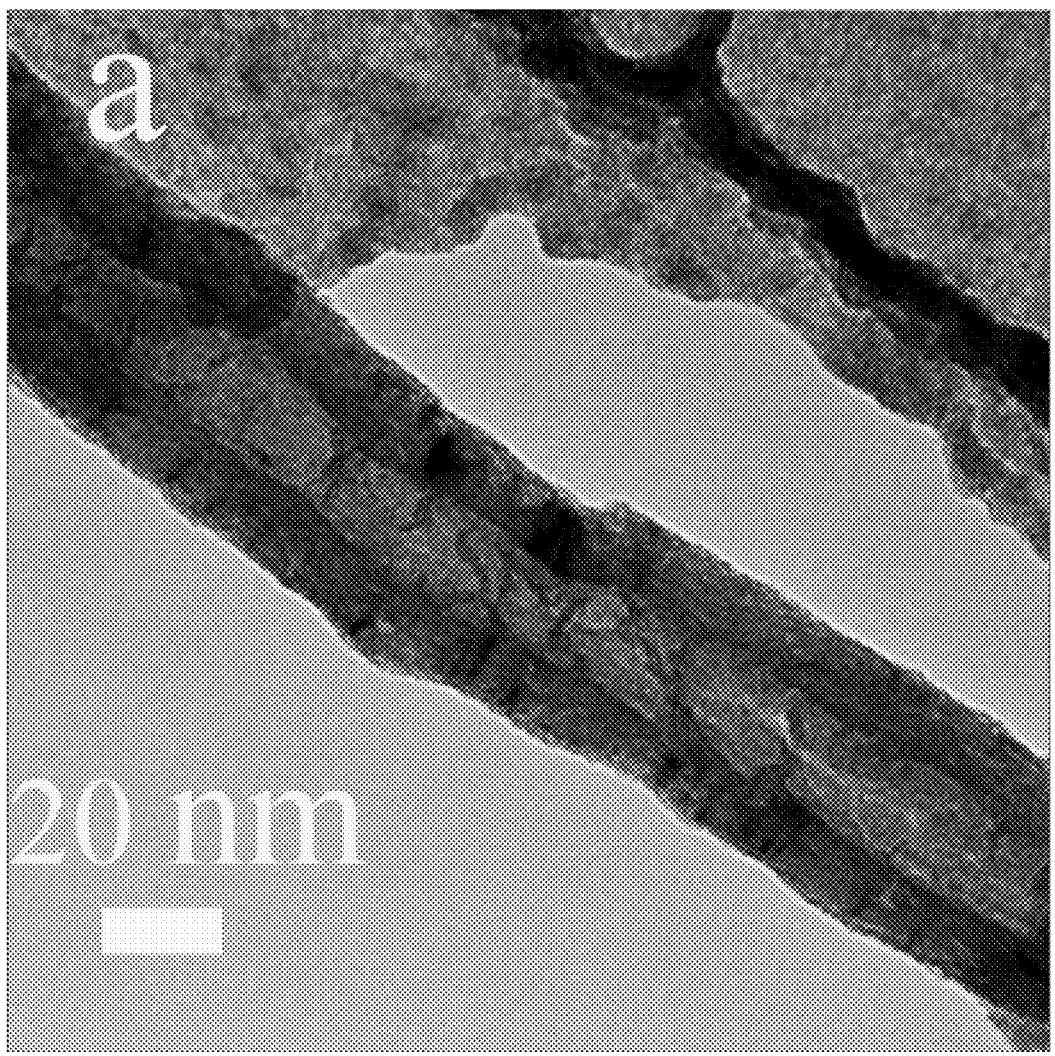
FIG. 5A is a representation of a transmission electron microscope (TEM) image of the carbon nanostructure obtained in accordance with certain embodiments.
Figure 5B:
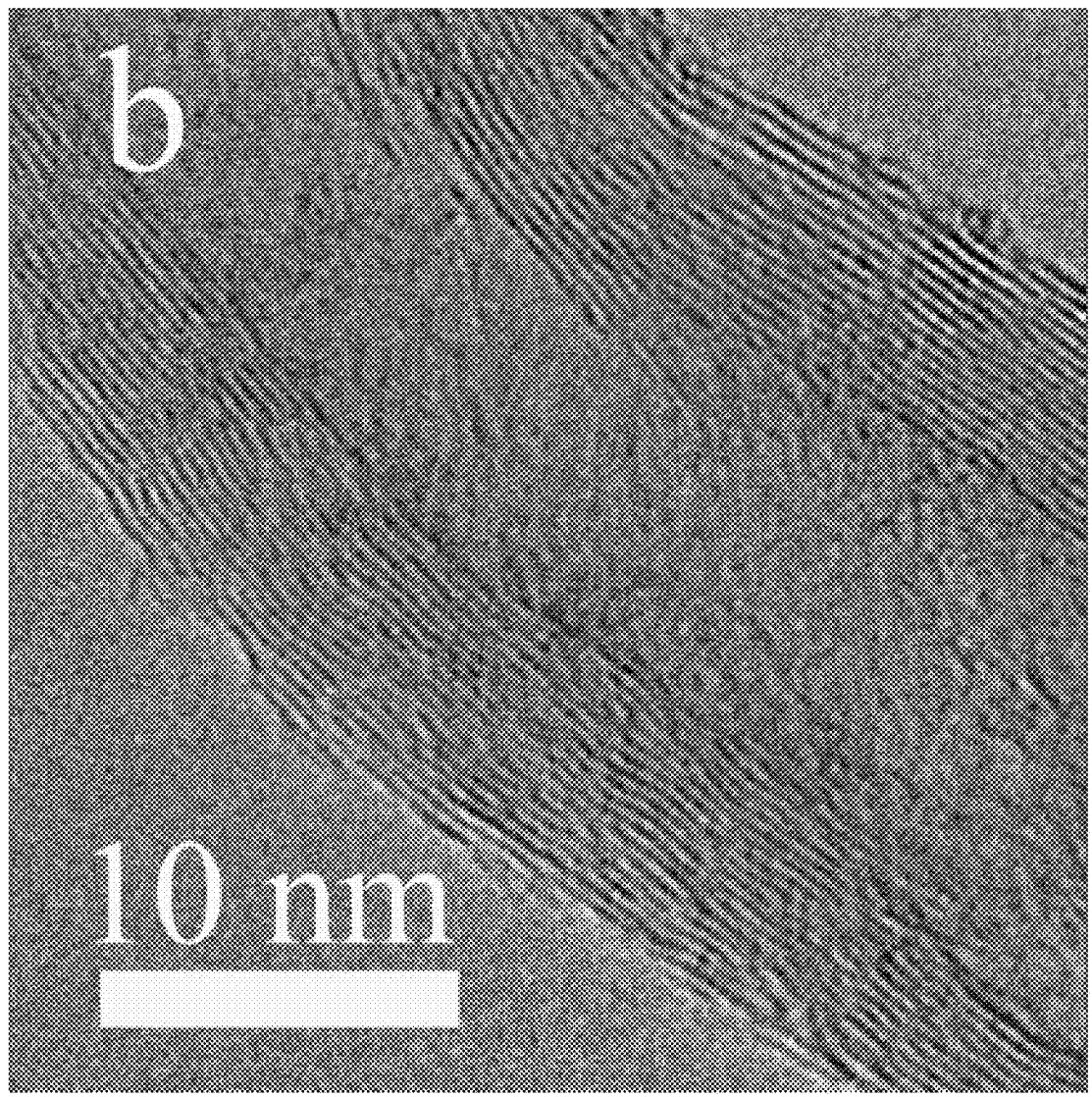
FIG. 5B is a representation of a transmission electron microscope (TEM) image of the carbon nanostructure obtained in accordance with certain embodiments.
Figure 6:
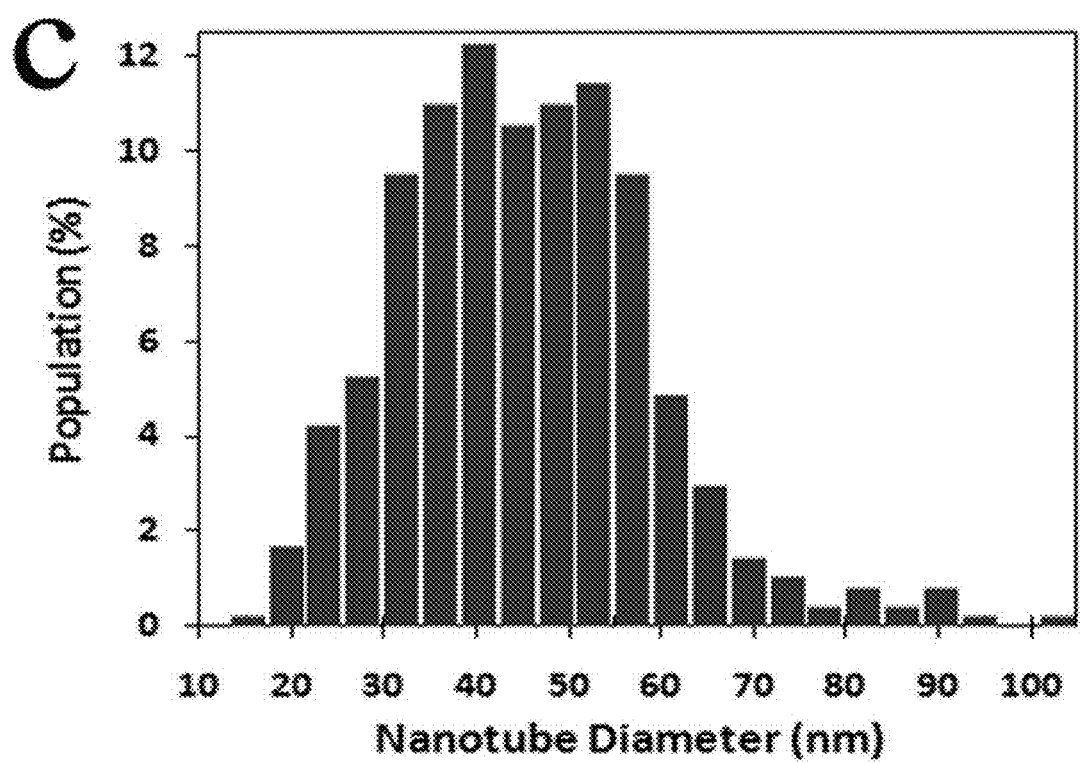
FIG. 6 is a graphical representation showing a statistical analysis of the diameter of the carbon nanostructure obtained in accordance with certain embodiments.

In order to assess more detailed characteristics, TEM was implemented which allows for significantly higher magnifications, as shown in FIGS. 5A and 5B. For TEM, a JEOL 1010 instrument was used with an accelerating voltage of 70 kV, whereas a JEOL 2010 instrument was operated with an accelerating voltage of 200 kV. The material deposited on the surface of the stainless steel mesh was dispersed in ethanol, assisted by sonication. Drops of the resulting dispersion were deposited on a holey carbon film (200 copper mesh, EMS Com.) and allowed to dry, which was then inserted in the specimen chamber of the TEM instrument. A statistical analysis of the MWCNT (FIG. 6) diameter with the sample size n=475 indicated a mean tube diameter of 43.6 nm. A precision of ±0.7 nm was determined for this value. A quantity of 86% of CNTs have diameters lying between the mean and one standard deviation above the mean.

Examination of the wall structures showed the presence of parallel graphitic layers (FIGS. 5A and 5B). The latter also revealed the presence of 16 layers with a separation of about 3.6-3.8 Å. This inter-lattice distance is consistent with the 3.44 Å value that has been previously calculated as the theoretical distance between layers in graphite layers, and also reported based on measurements. Wall defects, as seen in FIG. 5B, are expected to generally reduce the electrical conductivity and mechanical strength; therefore, reducing their utility at least in some applications taking advantage of CNT. For instance, defects in the wall structures can cause energy concentration points and lead to premature failure. However, higher temperature and increased residence time may reduce defects and to increase the degree of graphitization.

Figure 7:
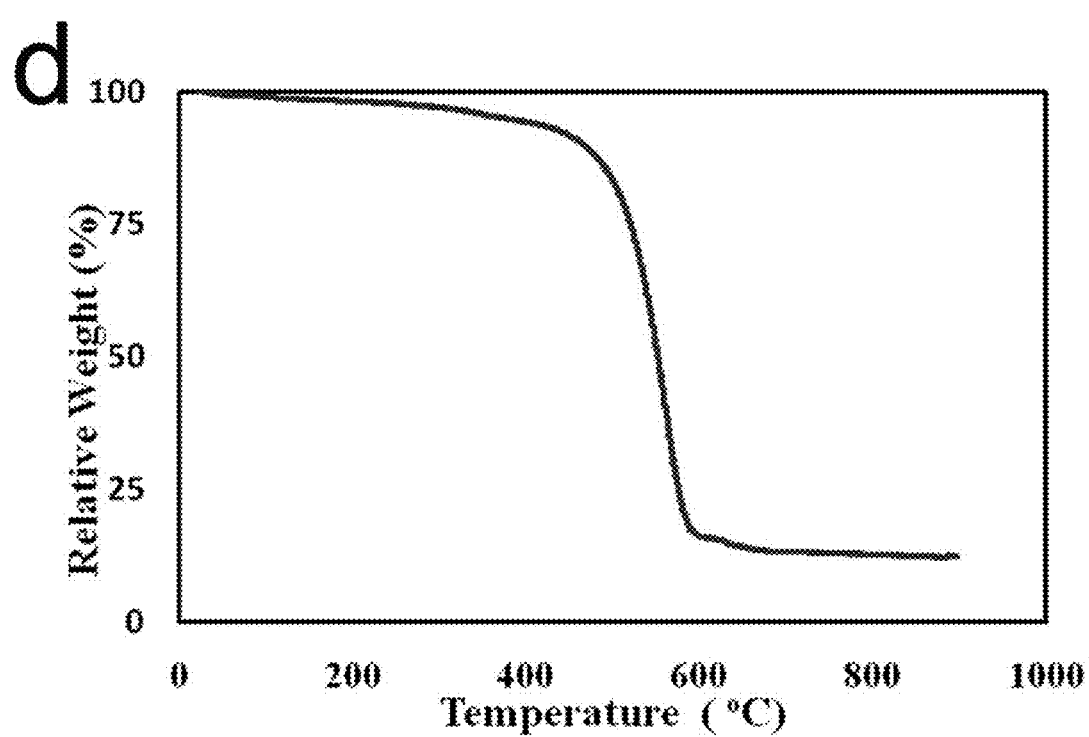
FIG. 7 is a graphical representation of a thermogravimetric analysis (TGA) under air of the carbon nanostructures obtained in accordance with certain embodiments.

The carbonaceous material was also assessed by means of thermogravimetric analysis (TGA). For TGA measurement, material grown on metal screens has been removed by suspension in alcohol followed by solvent removal. The resulting powder was analyzed in a TGA 11000 instrument, (Instrument Specialists, Twin Lakes, Wis.) using a heating rate of 5 K/min under air. As shown in FIG. 7, after a rather slow weight loss until approximately 450° C., there is a rapid decline in mass until oxidation is completed around 600° C. While the initial weight loss can be possibly attributed to the oxidation of tars, the consumption of most of the material beyond 525° C. is consistent with the presence of stable nanotube structures. Depending on the specific sample, remaining residues, likely consisting of metallic compounds from the substrate, have ranged from 2 to about 20%. The high abundance of carbonaceous material observed herein through TGA is in agreement with observations using SEM or TEM discussed above.

BET measurements were conducted by Clear Science, Inc. (Minneapolis, Minn.), using a Micromeritics Gemini 2375 Surface Area Analyzer and nitrogen as adsorbate gas. A low value of the Brunauer-Emmett-Teller (BET) surface area of 76.28±0.90 $m^2/g$ was determined. Such low BET value, as compared to other nanostructured carbon materials, e.g., single-walled carbon nanotubes, may be of significant interest for Li storage in Li-ion batteries as high surface areas can lead to irreversible adsorption.

Figure 8:
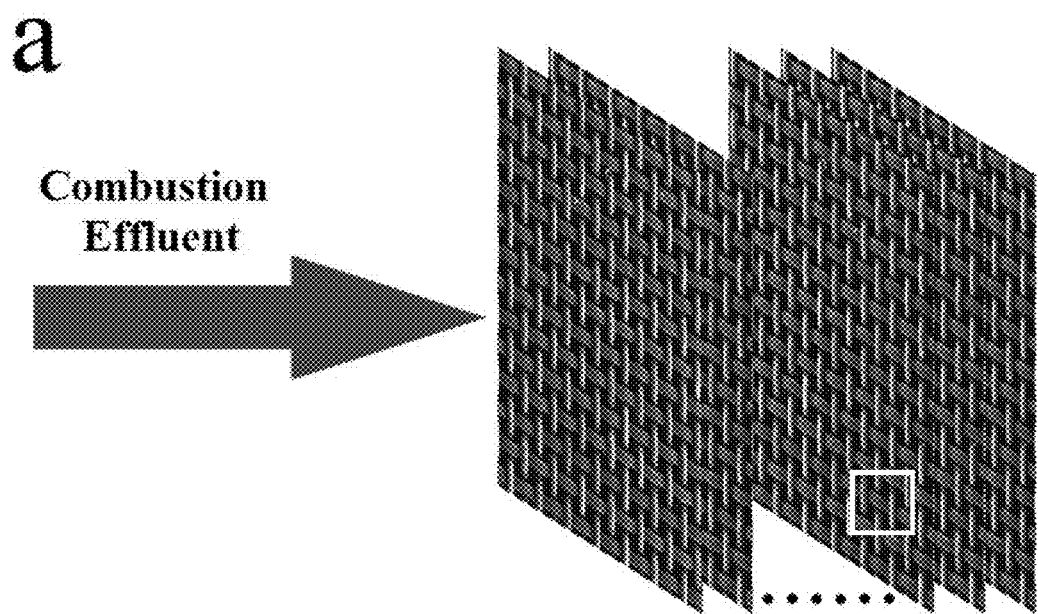
FIG. 8 is a schematic representation of a wire mesh catalyst together with its setup configuration in accordance with certain embodiments.
Figure 9:
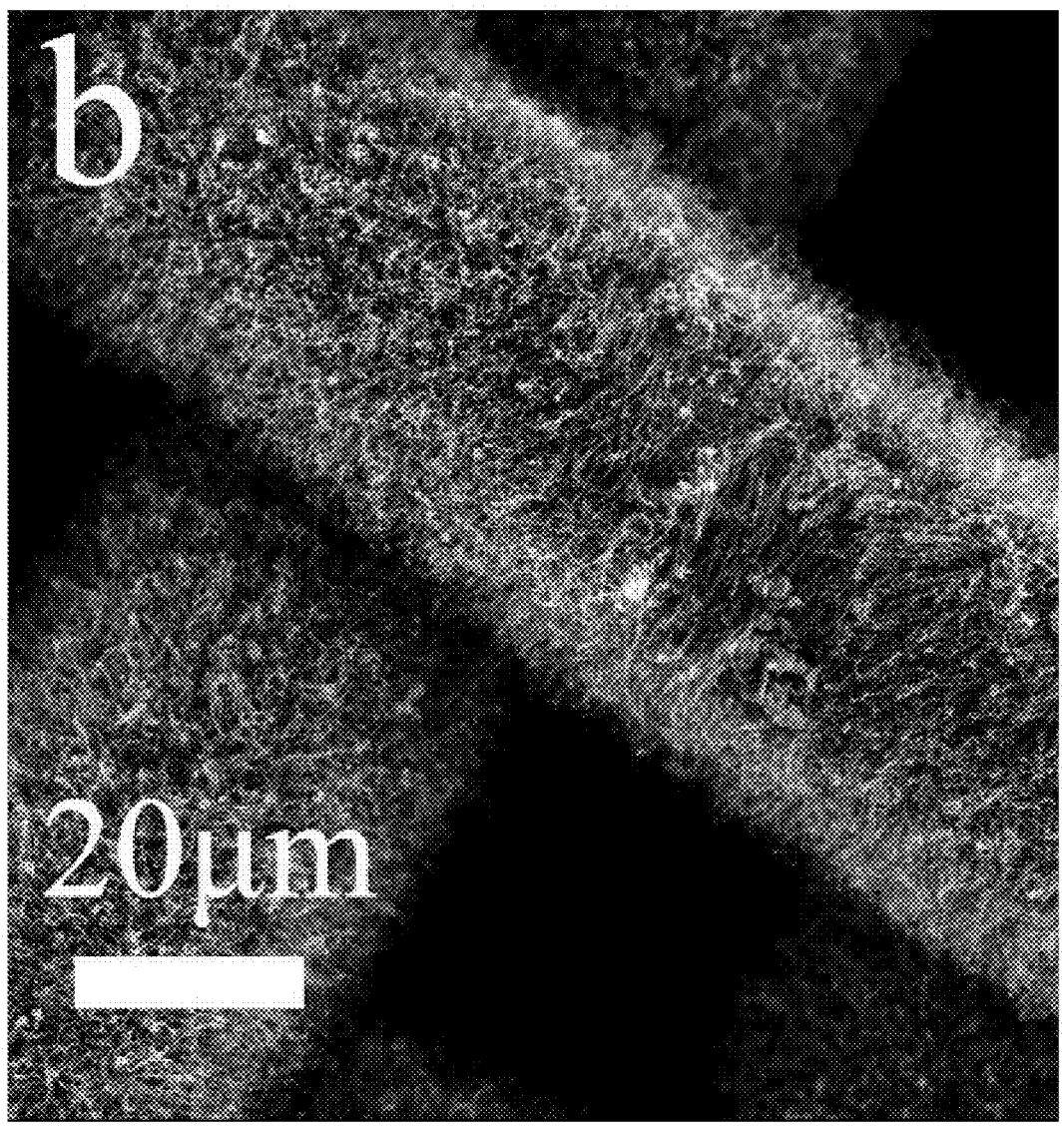
FIG. 9 is a representation of a scanning electron microscope (SEM) image of carbon nanostructures that have formed on a portion of the wire mesh catalyst shown in FIG. 8.

In this work, 25 segments of mesh, 4 $cm^2$ each, were placed normal to the flow direction, as shown in FIG. 8. The cylindrical stainless steel wires of each woven mesh provide the surface area (a nominal total of 240 $cm^2$) for the synthesis of carbon nanostructures (FIG. 9). This configuration allows for an order of magnitude increase in the total mass of the carbon nanostructures that were synthesized. In a single batch process having a duration of 30 sec, around 50 mg of carbonaceous material (accounting for 5%$_{wt}$ of the plastic waste) was synthesized, (before purification), allowing for further material characterization. A larger number of mesh segments can be utilized to further increase the yield.

Figure 10:
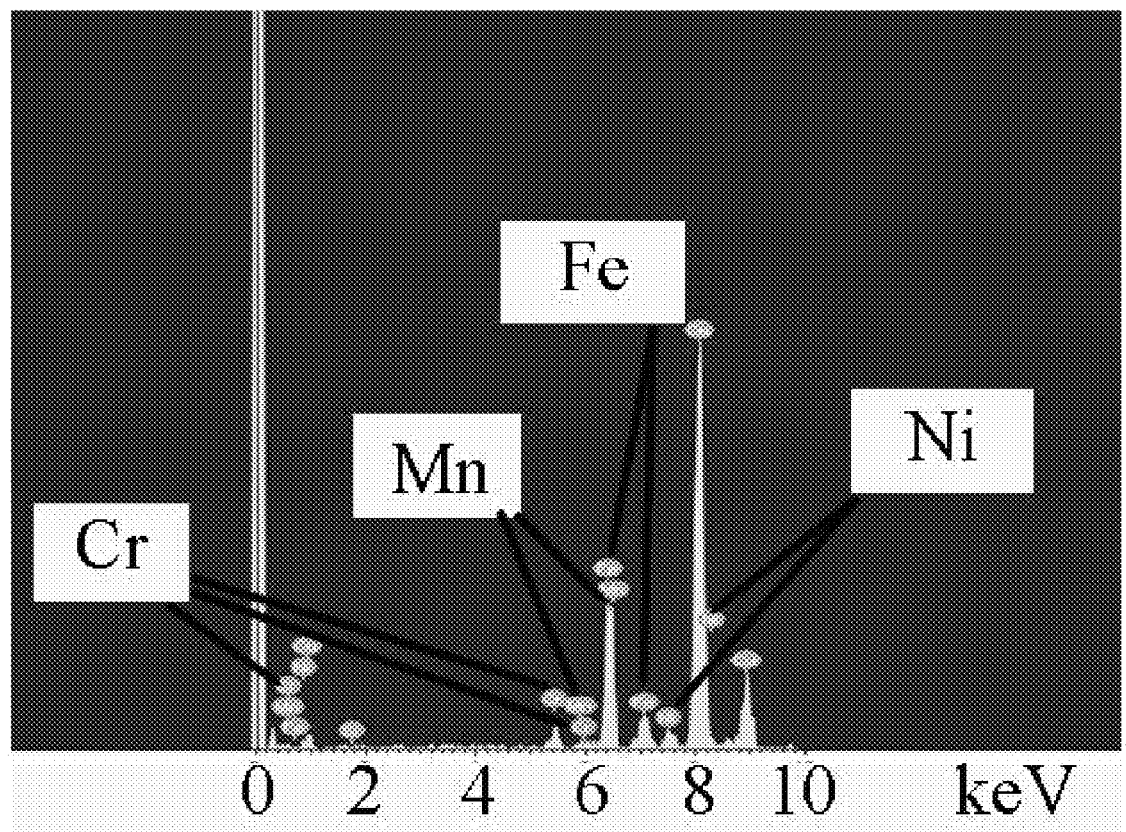
FIG. 10 is a representation of an energy dispersive X-ray spectroscopy (EDS) of catalyst used for carbon nanostructures synthesis obtained in accordance with certain embodiments.

Energy dispersive X-ray spectroscopy (EDS) revealed that nanoparticles residing at the tips of the carbon nanostructures consisted of nickel, iron, chromium, and manganese, showing that the catalyst particles have a heterogonous composition as would be expected in a alloyed metal such as steel. (See FIG. 10). For EDS, X-ray was focused on the catalyst samples using an Oxford EDS Hardware using silica as detector. The signal collection last for 60 sec and proceed by INCA software. Cliff Lorimer thin ratio section was chosen for quantification.

The major species present in the gas phase at the location of the catalyst during carbon nanostructure synthesis were determined using gas chromatography (GC) methods including flame ionization (FID) and thermal conductivity (TCD) detectors. The products of the synthesis conditions were compared with and without the presence of the catalyst. The addition of a catalyst and the corresponding synthesis of CNTs caused a 56% reduction in $H_2$, 12% reduction in CO, while the concentration of $CO_2$ increased slightly. This agrees with expectations that at 750° C., the most thermodynamically plausible source of solid monatomic carbon ($C_s$) is combustion-formed CO; this can be converted to $C_s$ either by the reaction 2 CO→$CO_2$+$C_s$, or by CO+$H_2$→$C_s$+$H_2O$. Other carbon producing reactions, such as direct decomposition of hydrocarbon pyrolyzates (e.g., methane and acetylene), are also likely, since they are thermodynamically favorable.

In this work, the potential for a low-cost alternative feedstock for the growth of carbon nanostructures, such as MWCNT, is demonstrated. The pyrolysis of waste plastics, followed by the premixed combustion of the resulting gases generates agents that grow carbon nanostructures on catalytic surfaces, having features similar to chemical vapor deposition (CVD) techniques. In this process, sufficient concentrations of carbon-containing species, particularly CO, and diatomic hydrogen are formed safely and economically from combustion of wastes. Utilizing a ceramic filter, flame-generated particulates (soot) were removed in order to take advantage of fuel-to-oxygen ratios higher than those which would otherwise be appropriate to preclude soot contamination. Moreover, a scaled-up industrial set-up can capture and utilize the energy released during the exothermic combustion of the fuel and, thus, offset the energy amounts needed to pyrolyze the waste plastics and to preheat the required gas flows, as the latter two are only a small fraction of the former. This energy feedback improves the overall energy-efficiency of the process and further minimizes the operating costs. In summary, industrial applications of this process use waste fuels as carbon nanotube growth agents, with significantly higher process efficiencies and with lower operating costs than those currently seen in the industrial production of carbon nanostructures, particularly carbon nanotubes.

Example 2

Experiment 1 was repeated, except the organic material used was waste biomass and no extra oxidizing agent was provided for the combustion process. 4.0 gram sugarcane waste, in fiber form and was pulverized in particle sizes lower than 500 μm, were loaded in a ceramic boat, which was then inserted into the first section of the furnace with a nitrogen gas served as carrying gas at the flow rate of 3 L/min ensuring the absence of oxygen and therefore pyrolytic conditions prevailed in the furnace. The temperature of the first furnace was set at 600° C., and the secondary furnace was set at 1000° C.

Figure 11A:
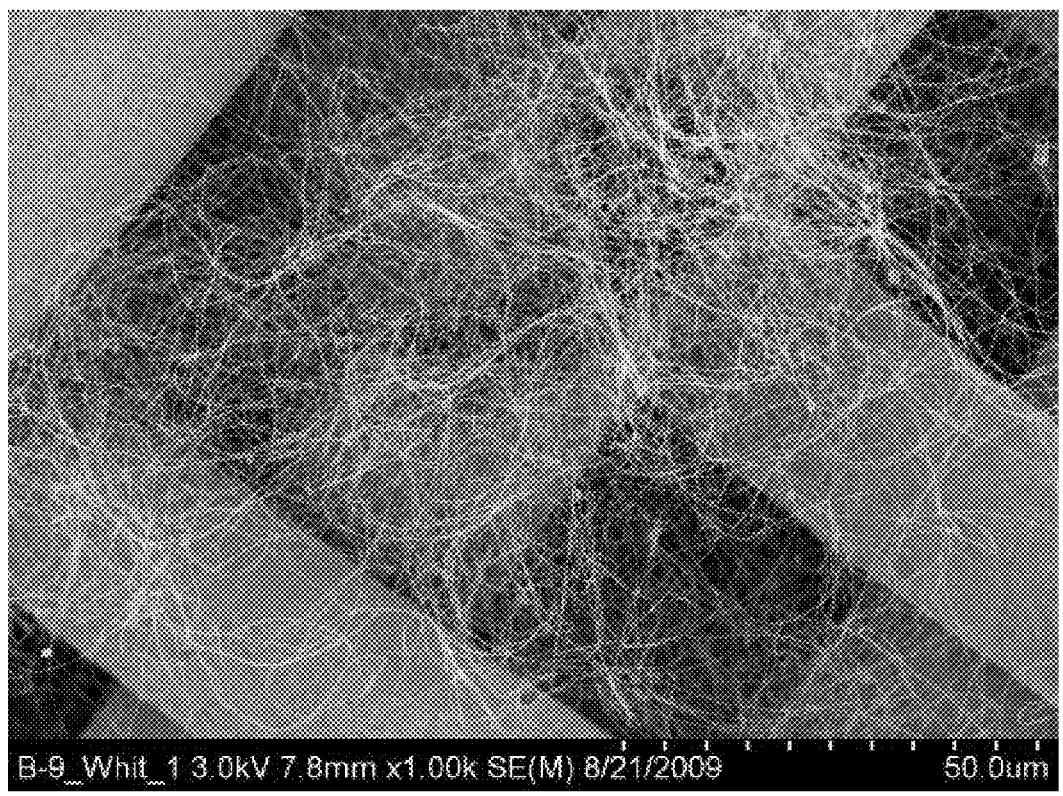
FIG. 11A is a representation of a scanning electron microscope (SEM) image of carbon nanostructures generated from waste biomass in accordance with certain embodiments.
Figure 11B:
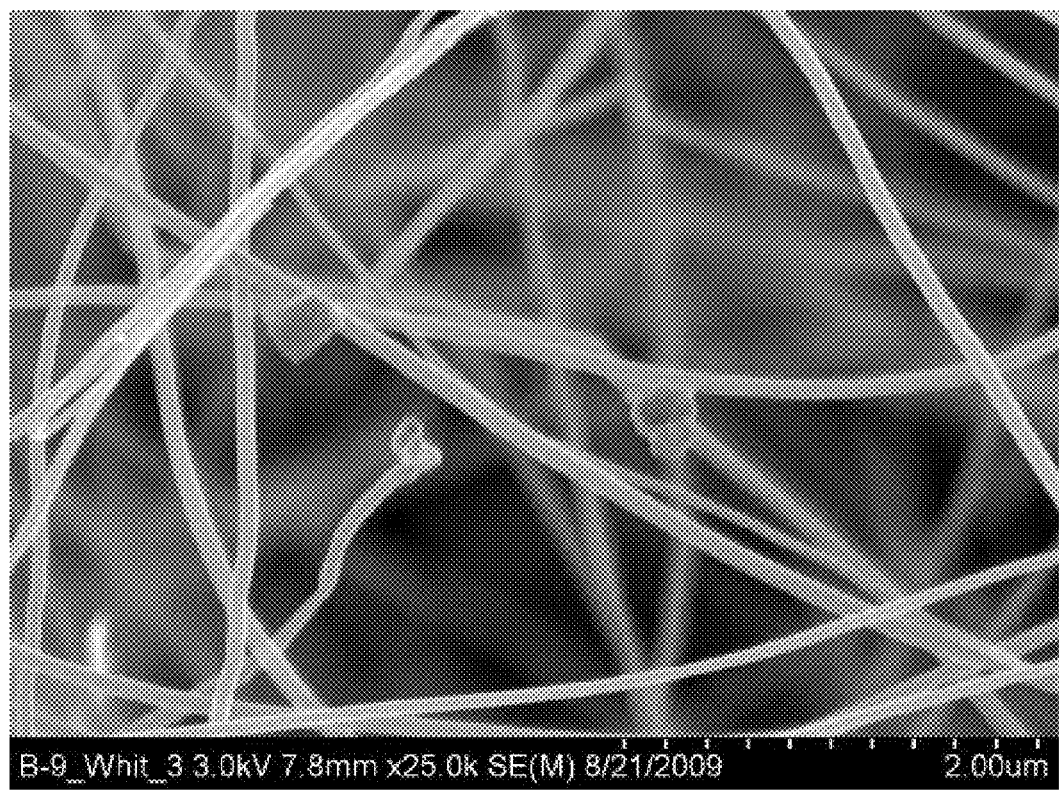
FIG. 11B is a representation of a scanning electron microscope (SEM) image of carbon nanostructures generated from waste biomass in accordance with certain embodiments.
Figure 11C:
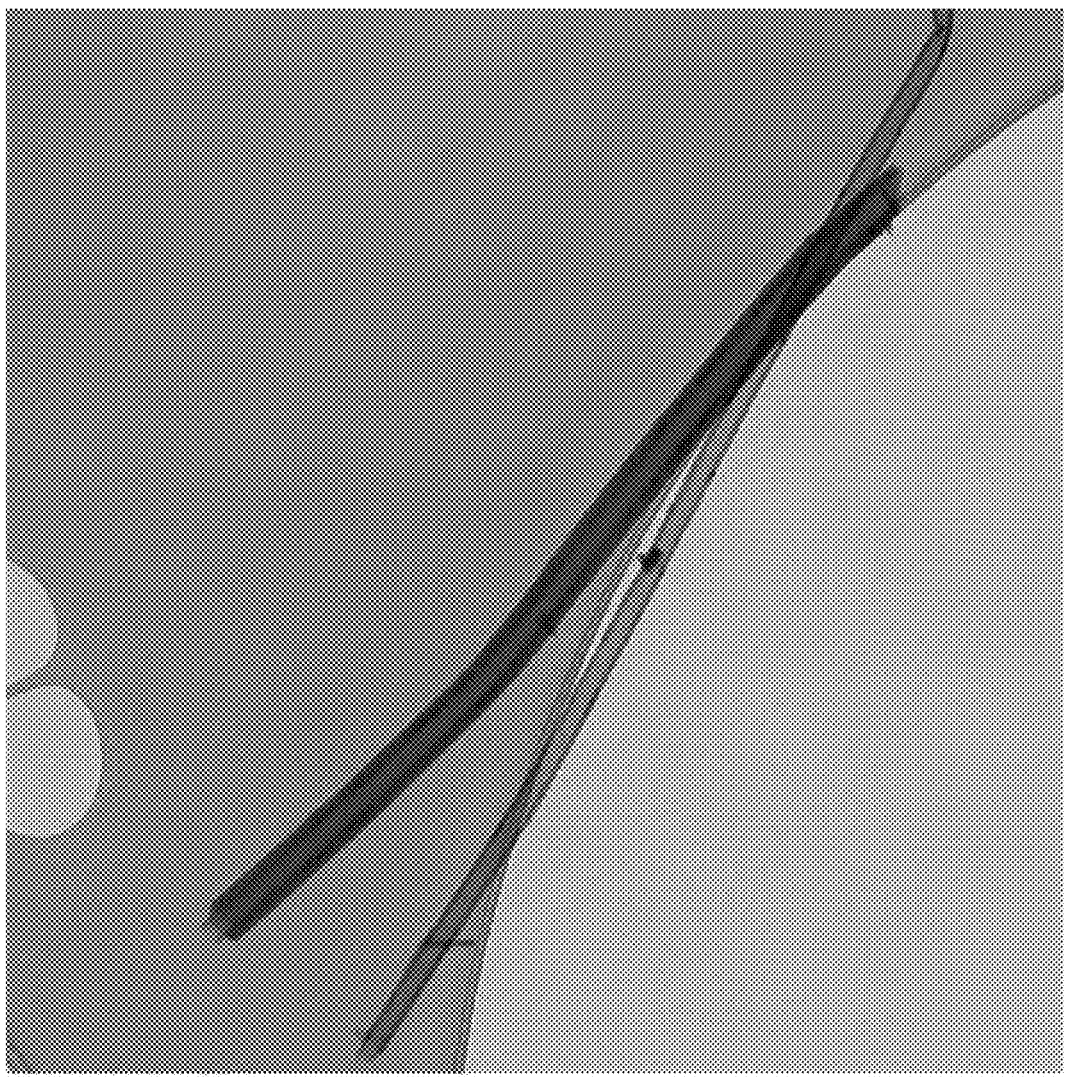
FIG. 11C is a representation of a transmission electron microscope (TEM) image of carbon nanostructures generated from waste biomass in accordance with certain embodiments.
Figure 11D:
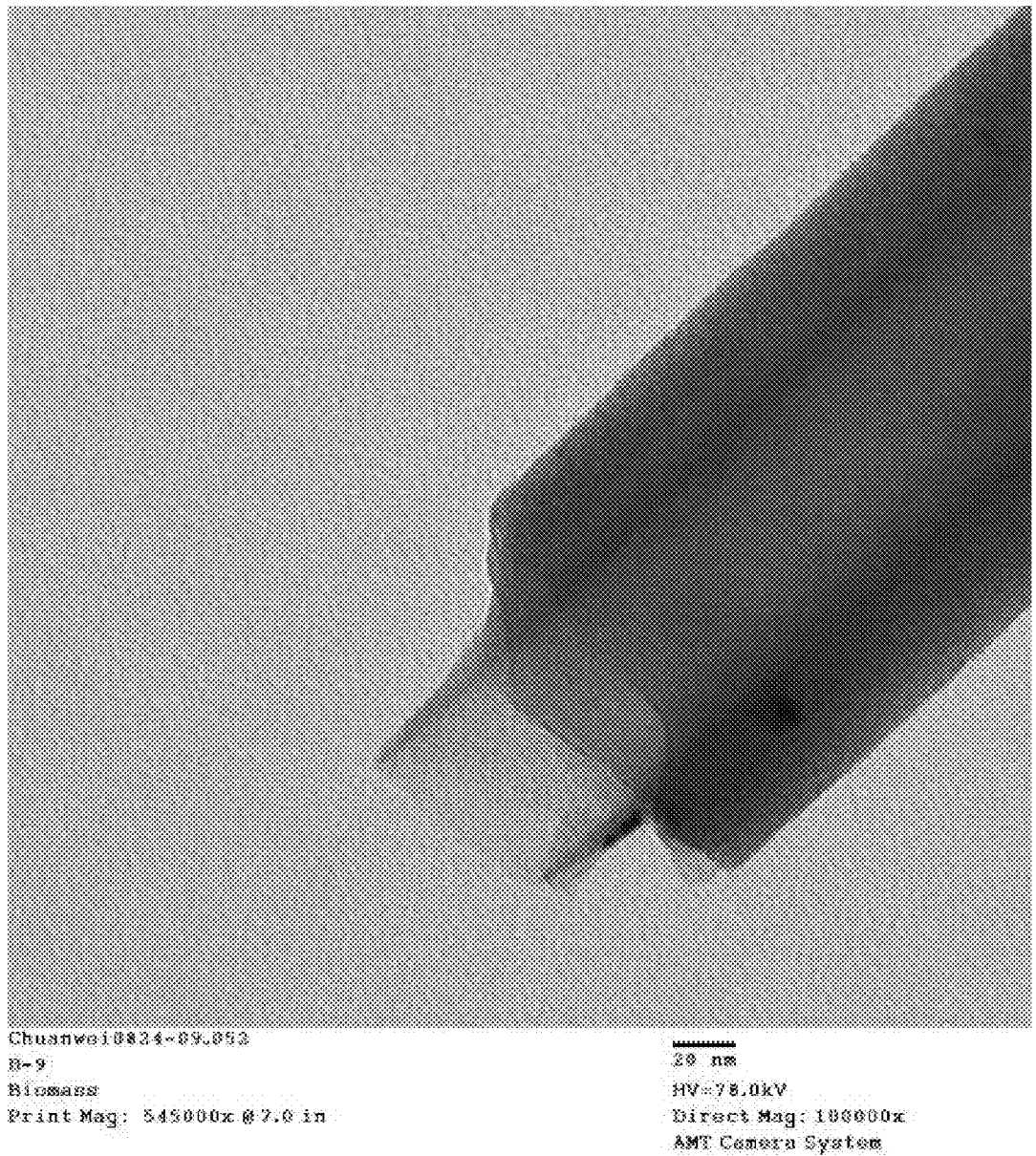
FIG. 11D is a representation of a transmission electron microscope (TEM) image of carbon nanostructures generated from waste biomass in accordance with certain embodiments.

FIGS. 11A through 11D show carbon nanostructures that were formed from waste biomass precursors. FIGS. 11A and 11B are SEM images and FIGS. 11C and 11D are TEM images of the carbon nanostructures obtained.

Example 3

Experiment 1 was repeated, except the organic material used was one gram of waste automobile tires, and that 17% of oxygen by volume was added. The temperature of the first furnace was set at 900° C., the nitrogen gas flow rate was set to 5 liters/minute, and the temperature of the second furnace was set at 1000° C.

Figure 12A:
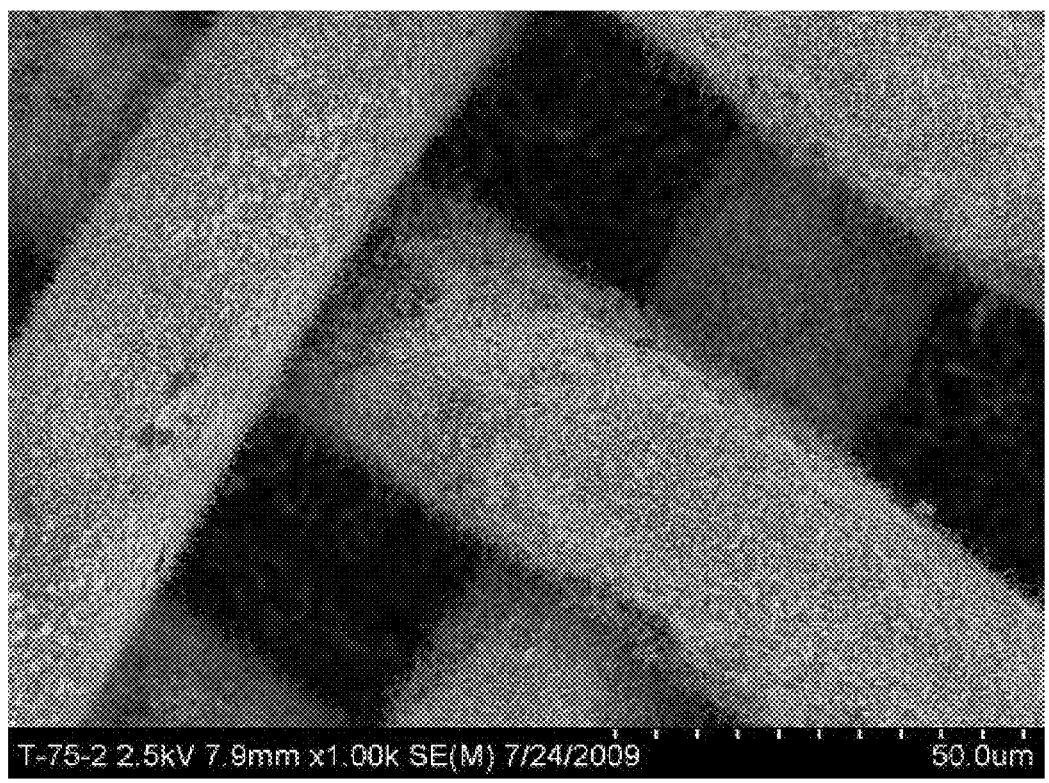
FIG. 12A is a representation of a scanning electron microscope (SEM) image of carbon nanostructures generated from waste automobile tire in accordance with certain embodiments.
Figure 12B:
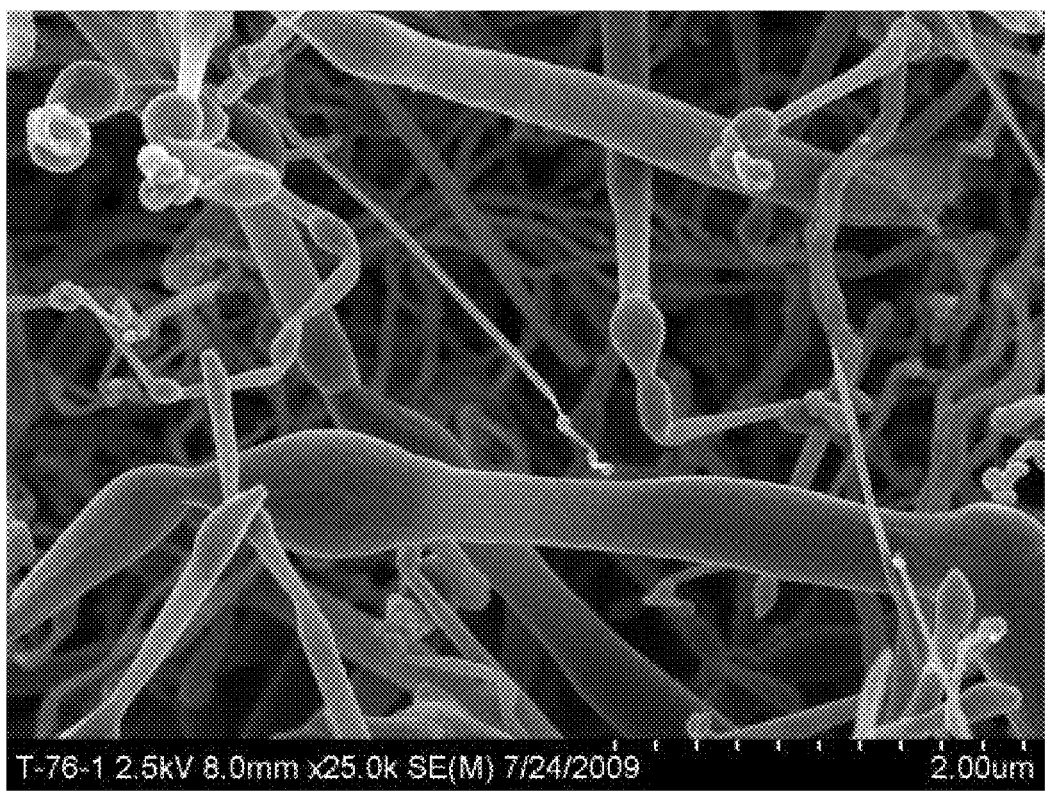
FIG. 12B is a representation of a scanning electron microscope (SEM) image of carbon nanostructures generated from waste automobile tire in accordance with certain embodiments.
Figure 12C:
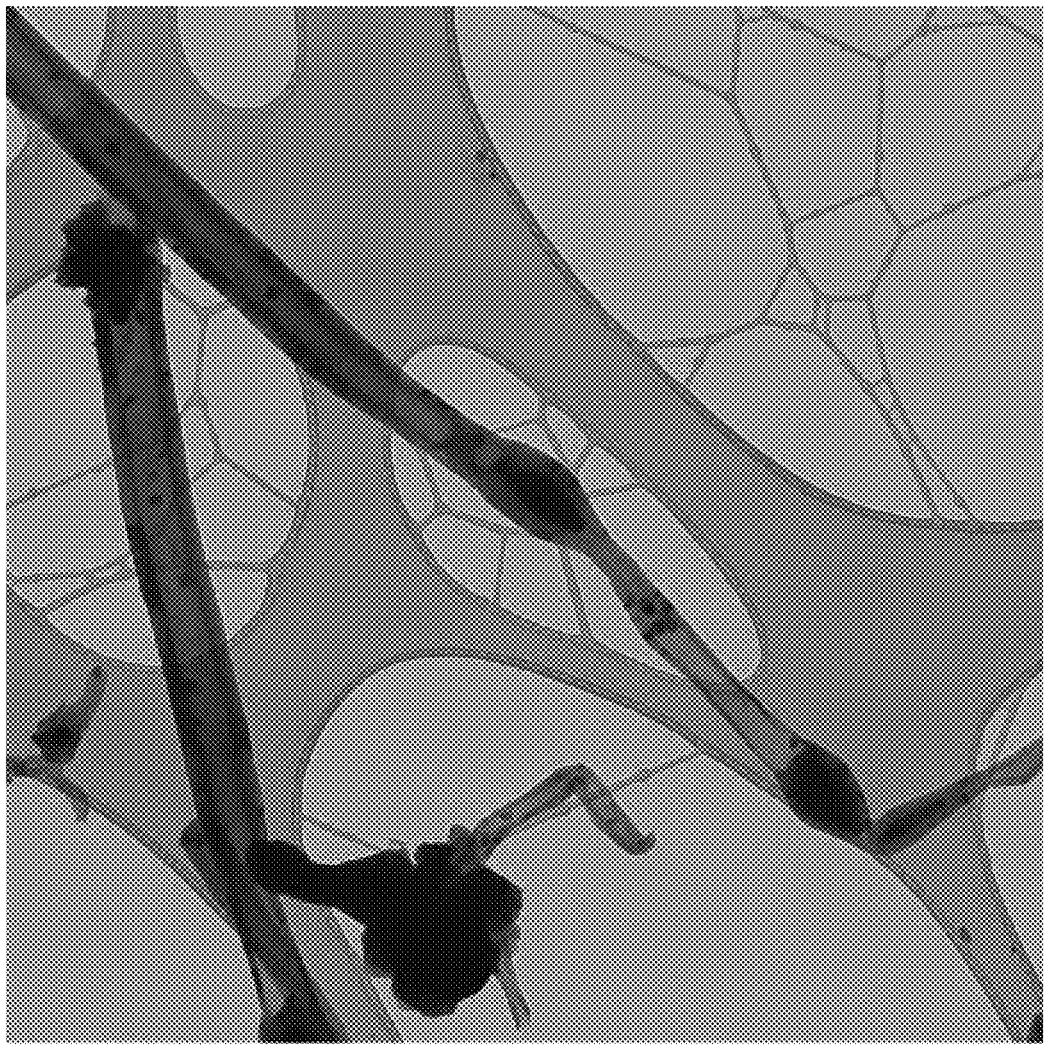
FIG. 12C is a representation of a transmission electron microscope (TEM) image of carbon nanostructures generated from waste automobile tire in accordance with certain embodiments.
Figure 12D:
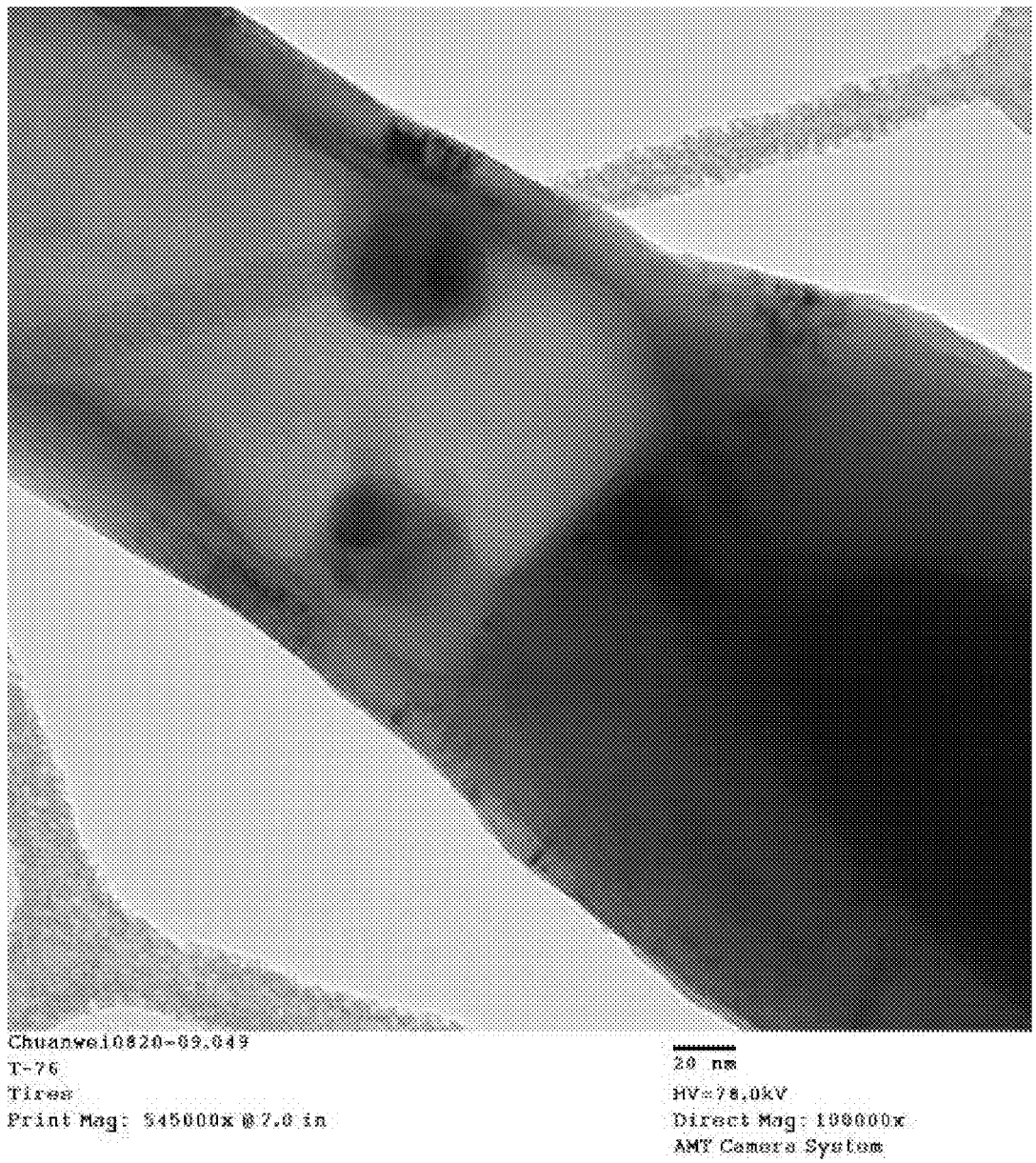
FIG. 12D is a representation of a transmission electron microscope (TEM) image of carbon nanostructures generated from waste automobile tire in accordance with certain embodiments.
Figure 12E:
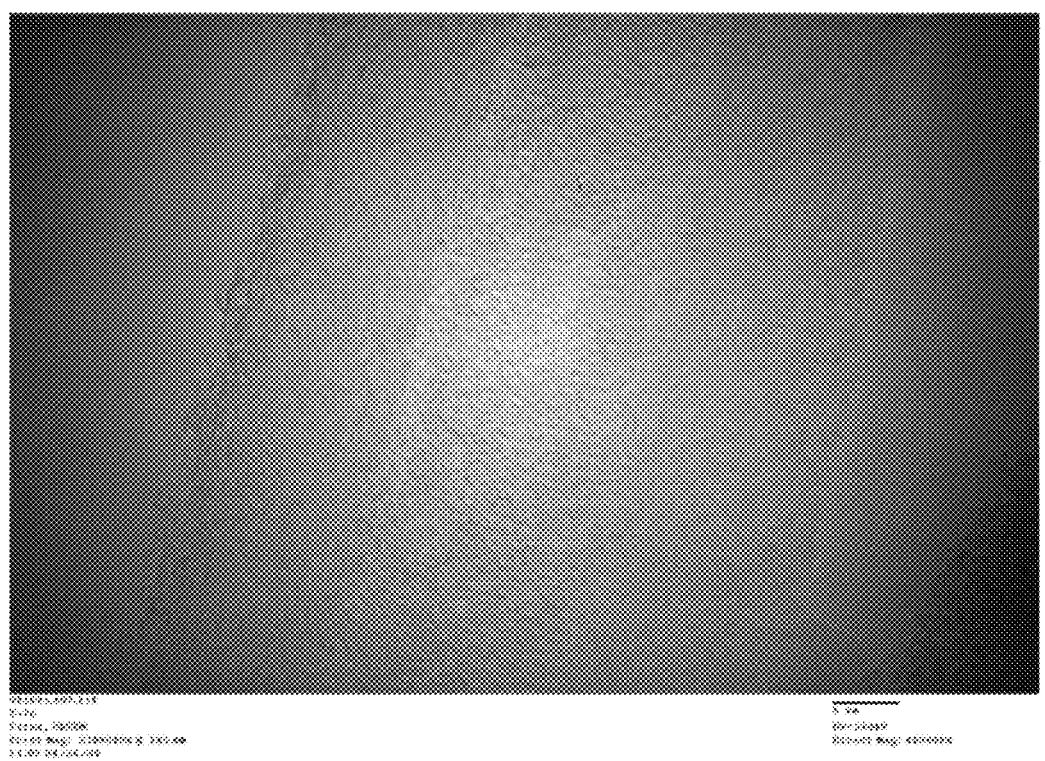
FIG. 12E is a representation of a high resolution transmission electron microscope (HRTEM) image of carbon nanostructures generated from waste automobile tire in accordance with certain embodiments.

FIGS. 12A through 12E show carbon nanostructures that were formed from waste automobile tires. FIGS. 12A and 12B are SEM images and FIGS. 12C and 12D are TEM images of the carbon nanostructures obtained. FIG. 12E shows a high resolution TEM (HRTEM) image of the carbon nanostructure.

Example 4

Experiment 1 was repeated, except the organic material used was polypropylene.

Figure 13A:
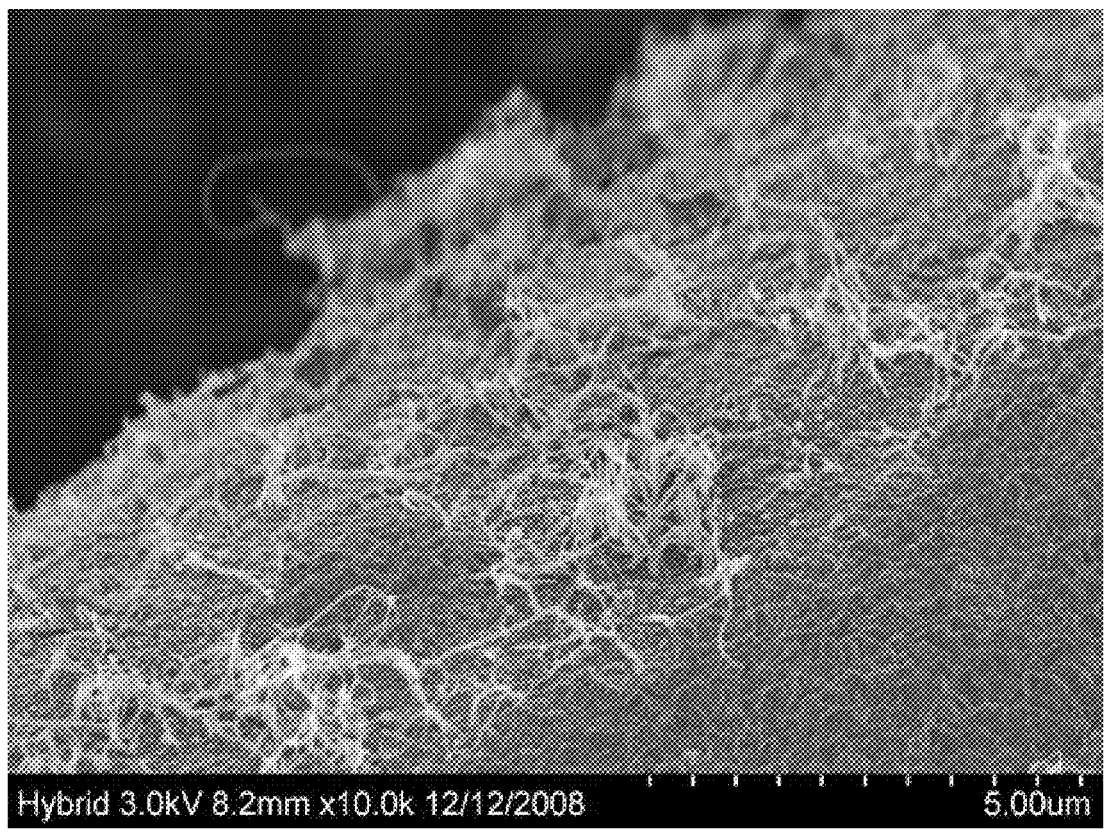
FIG. 13A is a representation of a scanning electron microscope (SEM) image of carbon nanostructures generated from polypropylene (PP) in accordance with certain embodiments.
Figure 13B:
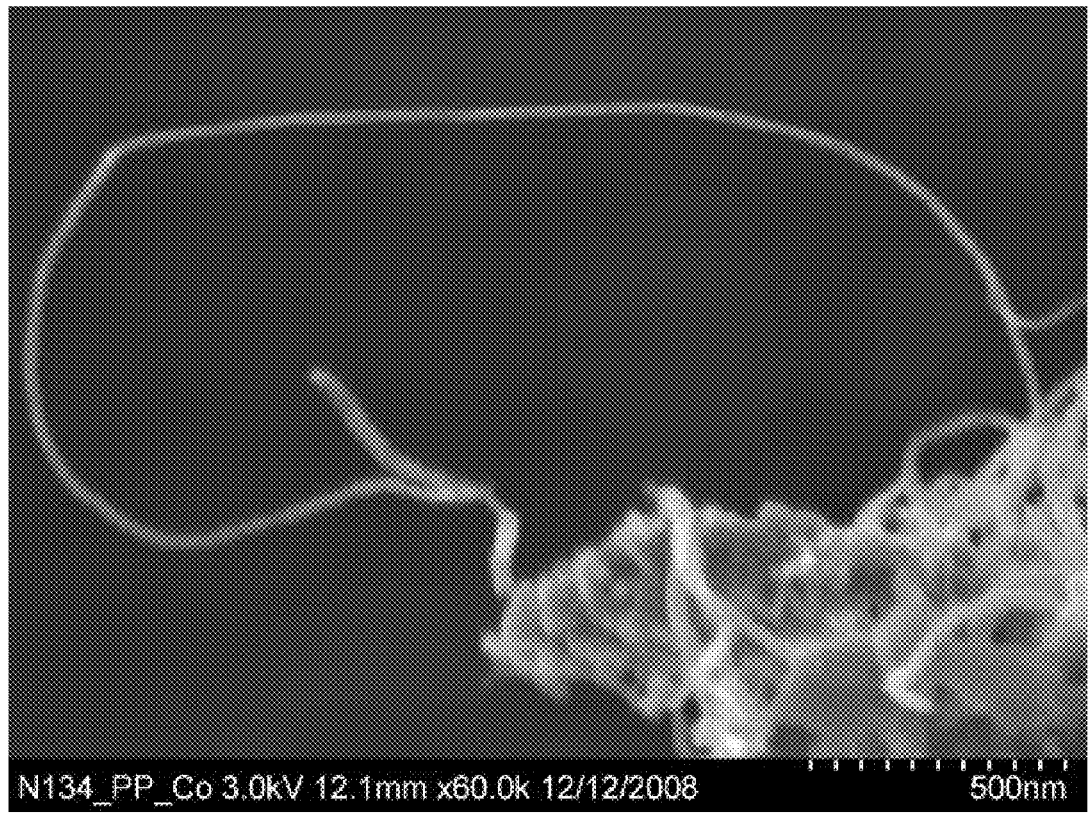
FIG. 13B is a representation of a scanning electron microscope (SEM) image of carbon nanostructures generated from polypropylene (PP) in accordance with certain embodiments.

FIGS. 13A and 13B show SEM images of carbon nanostructures that were formed from polypropylene.

Example 5

Experiment 1 was repeated, except the organic material used was polystyrene, and that no oxidizing gases were added, the temperatures of first furnace were set from 600° C. to 1000° C., the nitrogen gas flow rates were set from 1 liter/minute to 5 liters/minute, and second furnace were set at 750° C.

Figure 14A:
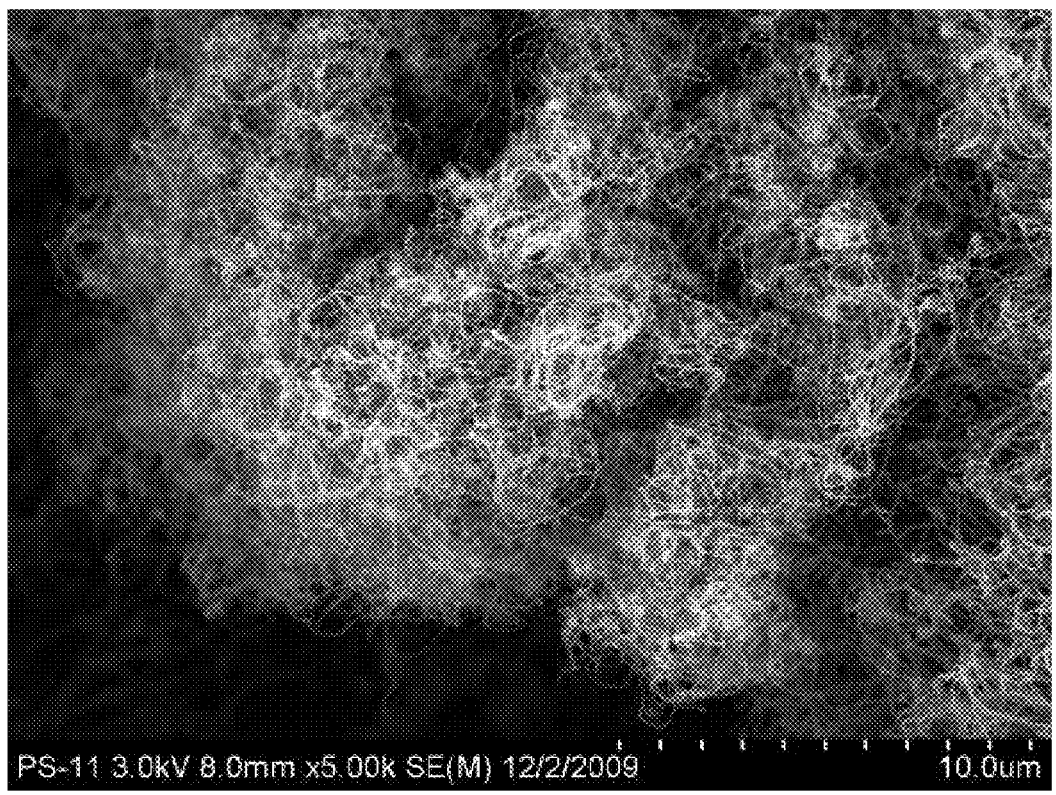
FIG. 14A is a representation of a scanning electron microscope (SEM) image of carbon nanostructures generated from polystyrene in accordance with certain embodiments.
Figure 14B:
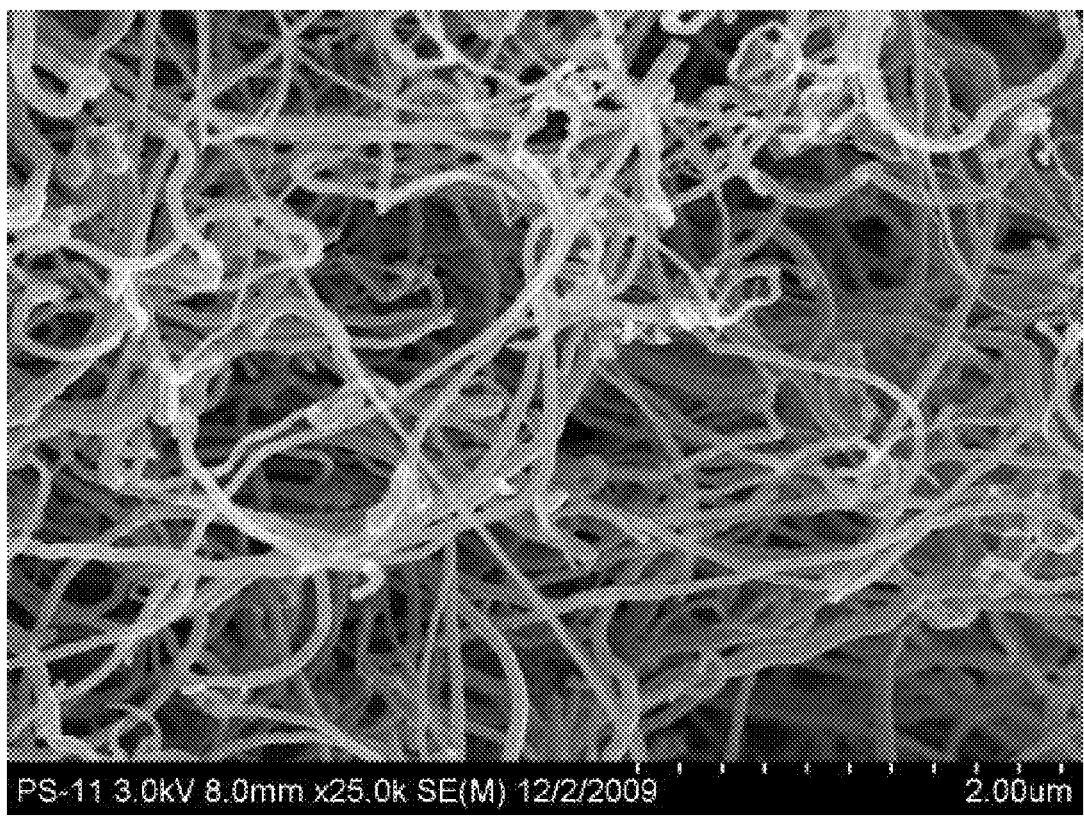
FIG. 14B is a representation of a scanning electron microscope (SEM) image of carbon nanostructures generated from polystyrene in accordance with certain embodiments.
Figure 14C:
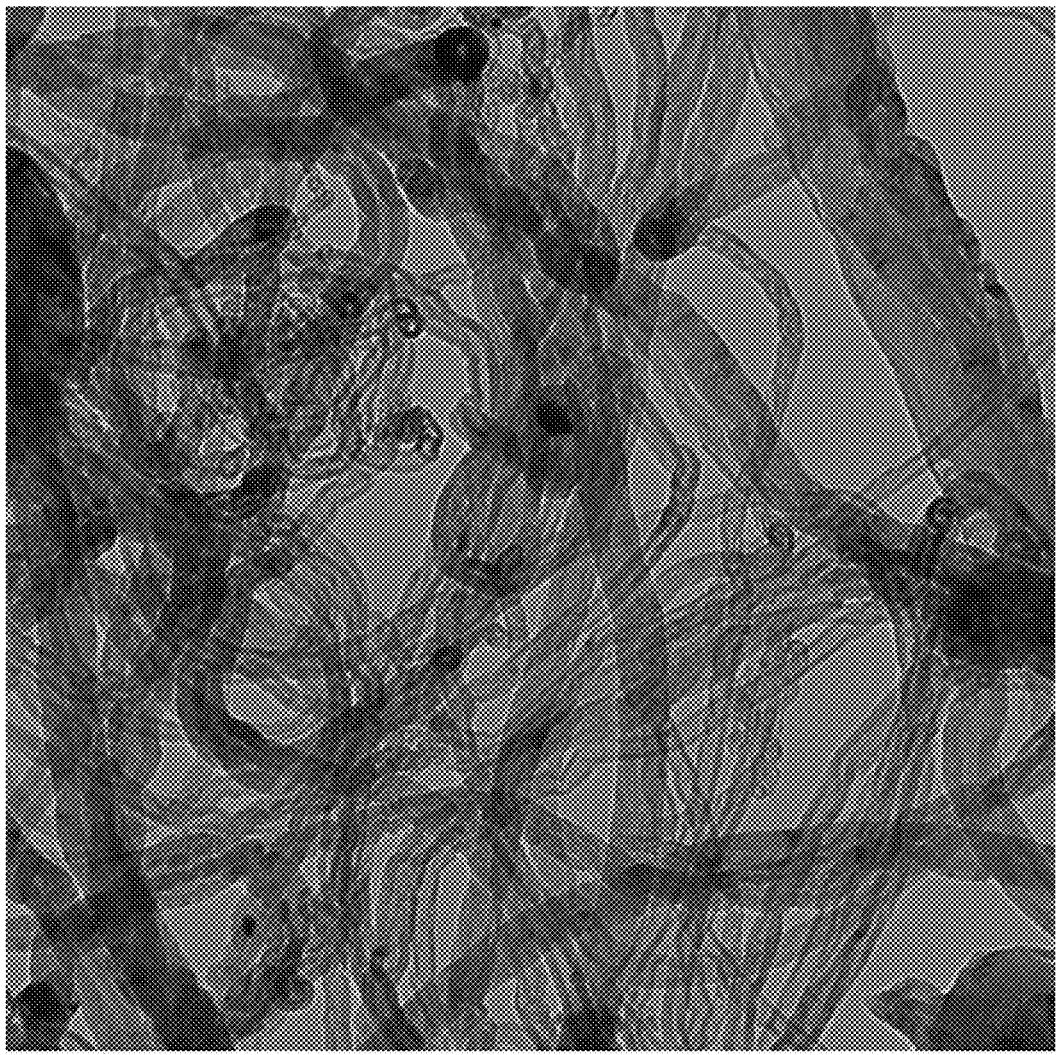
FIG. 14C is a representation of a transmission electron microscope (TEM) image of carbon nanostructures generated from polystyrene in accordance with certain embodiments.
Figure 14D:
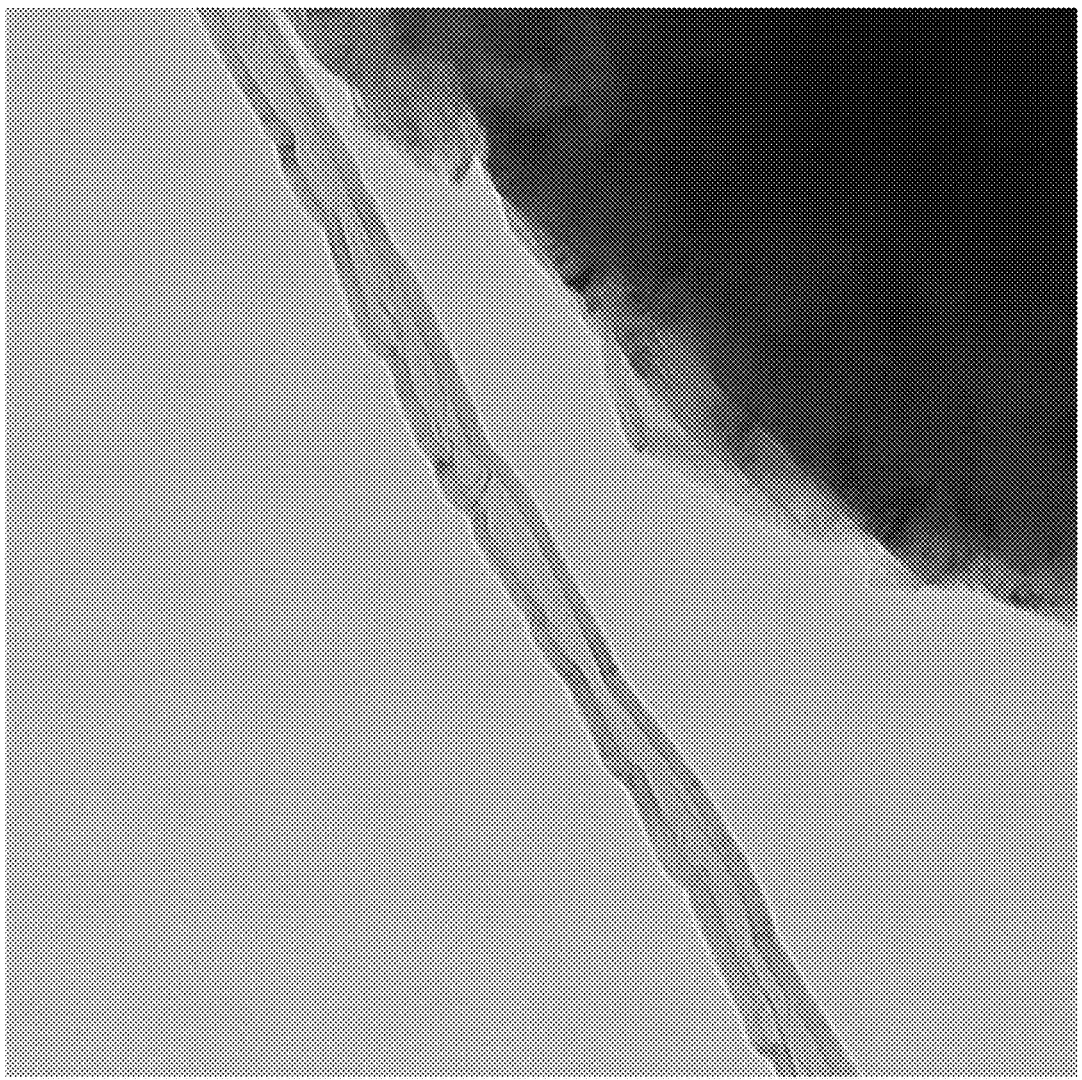
FIG. 14D is a representation of a transmission electron microscope (TEM) image of carbon nanostructures generated from polystyrene in accordance with certain embodiments.

FIGS. 14A through 14D show carbon nanostructures that were formed from polystyrene. FIGS. 14A and 14B are SEM images and FIGS. 14C and 14D are TEM images of the carbon nanostructures obtained.

EQUIVALENTS

Upon review of the description and embodiments of the present invention, those skilled in the art will understand that modifications and equivalent substitutions may be performed in carrying out the invention without departing from the essence of the invention. Thus, the invention is not meant to be limiting by the embodiments described explicitly above, and the various equivalents are intended to be encompassed within the scope of the claims which follow.

What is claimed is:

1. A method of synthesizing a carbon nanostructure, comprising:
   pyrolyzing an organic material in a first furnace set at a temperature to obtain one or more gaseous decomposition products;
   mixing the one or more gaseous decomposition products with an oxidizing agent to obtain a pre-mixed fuel-rich flame; and
   contacting one or more effluents of the fuel-rich flame with a supported catalyst in a second furnace to form the carbon nanostructure.

2. The method of claim 1, wherein the pyrolyzing step is carried out in an inert atmosphere.

3. The method of claim 1, further comprising adding hydrogen, oxygen, water vapor, sulfur-containing compound, or combinations thereof to promote activation of the supported catalyst.

4. The method of claim 3, wherein the hydrogen, oxygen, water vapor, sulfur-containing compound, or combinations thereof is added from about 0.0001% to about 80% by volume.

5. The method of claim 1, wherein the organic material comprises a solid plastic.

6. The method of claim 1, wherein the organic material comprises a liquid.

7. The method of claim 1, wherein the supported catalyst comprises a waste material.

8. The method of claim 1, further comprising adding an inert gas during the mixing step.

9. The method of claim 1, wherein the mixing step is carried out in a venturi section of the first furnace.

10. The method of claim 1, further comprising passing said one or more effluents of the fuel-rich flame through a filter prior to said contacting.

11. The method of claim 10, wherein the one or more effluents of the fuel-rich flame is passed through multiple filters.

12. A method of obtaining a carbon nanostructure, comprising:
    pyrolyzing an organic material in a first furnace at a temperature greater than 600° C. to obtain a feedstock which comprises one or more gaseous decomposition products;
    passing the feedstock through a filter to obtain a filtered gas; and
    providing the filtered gas to a carbon nanostructure manufacturing process in a second furnace to form a carbon nanostructure; wherein the organic material comprises a liquid.

13. The method of claim 12, further comprising mixing the one or more gaseous decomposition products with an inert gas.

14. The method of claim 12, wherein the pyrolyzing step is carried out in an inert atmosphere.

15. The method of claim 12, wherein the providing the feedstock in a carbon nanostructure manufacturing process comprises contacting the filtered gas with a supported catalyst to form the carbon nanostructure.

16. The method of claim 12, wherein the carbon nanostructure manufacturing process comprises a chemical vapor deposition process.

17. The method of claim 12, wherein the second furnace is at a temperature ranging from 600° C. to 1500° C.

18. The method of claim 12, wherein the filter comprises ceramic.

* * * * *